US009557734B2

(12) United States Patent
Maruyama et al.

(10) Patent No.: US 9,557,734 B2
(45) Date of Patent: Jan. 31, 2017

(54) CONTROL NETWORK SYSTEM, MASTER APPARATUS, CONTROL DATA PROCESSING METHOD, AND CONTROL DATA PROCESSING PROGRAM

(75) Inventors: Tatsuya Maruyama, Hitachi (JP); Tsutomu Yamada, Hitachinaka (JP); Shinji Yonemoto, Narashino (JP); Takashi Iwaki, Ichihara (JP); Hironori Ohashi, Narashino (JP); Yutaka Matsumoto, Narashino (JP); Ichiro Takahashi, Inzai (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 331 days.

(21) Appl. No.: 13/014,851

(22) Filed: Jan. 27, 2011

(65) Prior Publication Data
US 2011/0184533 A1    Jul. 28, 2011

(30) Foreign Application Priority Data
Jan. 27, 2010  (JP) .................................. 2010-015213

(51) Int. Cl.
  G06F 15/167   (2006.01)
  G05B 19/418   (2006.01)
  (Continued)

(52) U.S. Cl.
  CPC ......... *G05B 19/4185* (2013.01); *H04L 12/403* (2013.01); *H04L 12/40006* (2013.01);
  (Continued)

(58) Field of Classification Search
  CPC ..................... G05B 19/4185; H04L 12/40006; H04L 12/403; H04L 12/40032; H04L 2012/4026
  (Continued)

(56) References Cited

U.S. PATENT DOCUMENTS 5,815,659 A      9/1998  Umetsu et al.
6,751,682 B1 *   6/2004  Stirling ............................ 710/9
(Continued)

FOREIGN PATENT DOCUMENTS

EP    1 119 141 A1    7/2001
JP    8-335104        12/1996
(Continued)

OTHER PUBLICATIONS

European Search Report for Application No. 11152329.6-2415 / 2354874, issued on Jul. 13, 2012.
(Continued)

*Primary Examiner* — Joseph Greene
(74) *Attorney, Agent, or Firm* — Baker Botts L.L.P.

(57) ABSTRACT

A control computer as a master apparatus in a control network system includes a packet generation unit. The packet generation unit: selects a control command for writing a data from among packet generation information; references the packet generation information for each of the selected control command; and includes a data for write which is read from an address in a storage section corresponding to the each control command, in a control packet to generate the control packet. A communication unit transmits the generated control packet to a controlled object as a slave device.

13 Claims, 18 Drawing Sheets

(51) Int. Cl.
*H04L 12/40* (2006.01)
*H04L 12/403* (2006.01)
*G06F 15/16* (2006.01)

(52) U.S. Cl.
CPC *H04L 12/40032* (2013.01); *H04L 2012/4026* (2013.01); *Y02P 90/18* (2015.11)

(58) Field of Classification Search
USPC .......................................... 709/208–211, 213
See application file for complete search history.

(56) References Cited

U.S. PATENT DOCUMENTS

| | | | |
|---|---|---|---|
| 8,065,455 B2* | 11/2011 | Hilscher | H04L 12/407 710/104 |
| 8,108,736 B2* | 1/2012 | Uchibori | 714/49 |
| 2005/0174877 A1* | 8/2005 | Cho et al. | 365/232 |
| 2008/0146244 A1* | 6/2008 | Inoue et al. | 455/452.2 |
| 2009/0070507 A1* | 3/2009 | Asano et al. | 710/110 |

FOREIGN PATENT DOCUMENTS

| | | |
|---|---|---|
| JP | 2000-076163 | 3/2000 |
| JP | 2009-188631 | 8/2009 |
| WO | WO00/14929 | 3/2000 |

OTHER PUBLICATIONS

Janssen Dirk et al., "EtherCat—the Ethernet fieldbus", retrieved on Jul. 27, 2007, pp. 62-67.

JP Office Action for Japanese Application No. 2010-015213, issued on May 14, 2013.

* cited by examiner

FIG.4A

System information 170

| Control instruction name | Command | Slave identifier | Address | Input/output direction | Size | |
|---|---|---|---|---|---|---|
| POSITION | LRW | — | 0x2000 | write read | 4 | 171a |
| SPEED | LRW | — | 0x3000 | write read | 4 | 171b |
| TORQUE | FPRW | 0x1001 | 0x1600 | write read | 4 | 171c |

Packet generation information 141

| Command | Address | Slave identifier | Physical/logical address | Input/output direction | Size | |
|---|---|---|---|---|---|---|
| LRW | 0x0000 | — | 0x2000 | write read | 4 | 141a |
| LRW | 0x0004 | — | 0x3000 | write read | 4 | 141b |
| FPRW | 0x0008 | 0x1001 | 0x1600 | write read | 4 | 141c |

Address correspondence information

| Address | Bus address | Logical address | Size |
|---|---|---|---|
| 0x0 | 0xef000000 | 0x10000 | 0xffff |
| 0x10000 | 0xef020000 | 0x20000 | 0xffff |

Packet generation information

| Logical address | Input/output direction | Size |
|---|---|---|
| 0x10000 | write | 4 |
| 0x10004 | read | 4 |
| 0x10008 | write read | 4 |

201a
201b
201c

CONTROL NETWORK SYSTEM, MASTER APPARATUS, CONTROL DATA PROCESSING METHOD, AND CONTROL DATA PROCESSING PROGRAM

CROSS REFERENCE TO RELATED APPLICATIONS

This application claims the benefit of Japanese Patent Application No. 2010-015213 filed on Jan. 27, 2010, the disclosure of which is incorporated herein by reference.

BACKGROUND OF THE INVENTION

1. Field of the Invention

The present invention relates to techniques of a control network system, a master apparatus, a control data processing method, and a control data processing program.

2. Description of the Related Art

In a configuration of a control system, one or more control computers (master apparatuses) control one or more controlled devices (slave devices) via a network. The master apparatus controls the slave device by transmitting a control packet including a control instruction or the like to the slave device. The network in which the control packet flows is, for example, DeviceNet, CC-Link (registered trademark), and EtherCAT (registered trademark).

An API (Application Programming Interface) in a control application includes various methods. In one of the methods, a packet to be transmitted is built in the API itself, and a control instruction is stored in a data area in the packet.

In another method of the API, a data area of a controlled object is allocated to an address space to which is accessible from a control application, and a control instruction is written to the data area. The control instruction written to the address space is built as an outgoing packet using a prescribed technique and is transmitted to a network.

In some cases, the address space is a software object developed in a memory. In others, the address space is a bus space in a hardware which is accessible from a computation unit such as a CPU.

One of methods of allocating a data area to a prescribed address space is a transfer memory method (see Japanese Laid-Open Patent Application, Publication No. 2000-076163, and ISO (International Organization for Standardization) 14745-4, "Industrial Automation Systems and integration-Open systems application integration frameworks, Part 4 Reference description for Ethernet-based control systems". In the transfer memory method, data areas of all nodes constituting a network are allocated to an address space in equal size. Data in the address spaces in the all nodes are periodically exchanged among the all nodes via communications. Networks using the above-mentioned method include CC-Link and FL-net. The transfer memory method is also called a common memory method.

Another method of allocating a data area to a prescribed address space is a logical address space method. In the logical address space method, a given data area owned by each slave is allocated to a single virtual logical address space. Size of the allocated area or how to allocate can be arbitrarily set. Networks using the method as described above include EtherCAT (registered trademark) (see IEC61784, Part 2, Communication Profile Family 12).

With regard to an API in a method communicating a control instruction to a controlled object, a conventional technology has a difficulty in solving problems such as efficiency of developing software, communication performance in software, flexibility of network configuration, or the like.

In the method in which an outgoing packet is generated in an application and a control instruction to a controlled object is stored in the outgoing packet, an application developer is required to understand a communications protocol of a network. However, in developing such a control application, the application developer preferably focuses on realization of a desired control method and achievement of a target control performance. If the application developer has to understand details of a communications protocol, development man-hours are increased and application development becomes complicated, which is disadvantageous.

Further, if communications software such as an operating system (to be abbreviated as an OS hereinafter) is used, communication processing time is increased, and control performance in an entire system is decreased. Such communications software includes, for example, a TCP/IP protocol stack (which is described hereinafter as a protocol stack of communications software). A communication processing using a protocol stack requires an increased communication processing time because a control application and a communication processing are sequentially executed. Moreover, if other application is running on the OS, a runtime thereof also affects and may further increase the communication processing time.

In the transfer memory method, a data area of a controlled object is allocated into an address space, and an instruction is read or written to the data area. The method has an advantage that there is no need of understanding details of a communications protocol, compared to a method of generating an outgoing packet inside an application. However, in the transfer memory method, because data areas in fixed size as many as all nodes are allocated to an address space, the number of nodes connectable to the network tends to be limited.

The fixed-sized data area tends to create an unused free space therein. For example, assume a case where there are two controlled objects. One has scores of I/O of "2", and the other, "1,000". If a size of a target data area has "1,024", the latter controlled object can efficiently utilize the data area, but the former cannot, leaving almost all of the data area meaningless.

In the logical address space method, a data area of a controlled object can be arranged with less limitations, as compared to the transfer memory method. The logical address space method thus has a high use efficiency of an address space and smaller limitations on the number of connectable nodes. A network using the logical address space method has a larger maximum allowable number of connectable nodes than that of a network using the transfer memory method.

The logical address space method, however, also requires the developer to well understand which meaning a data at a prescribed address location has in an application, similarly to the transfer memory method. Therefore, it is not possible to develop an application in such a way that a meaning in a control application is expressed. The developer executes a processing on the application, to a prescribed address, which decreases development efficiency.

The logical address space method requires the application developer to have expertise on a logical address space or a network (such as generation of an outgoing packet), which results in prolonged time of application development and thus, further sophisticated necessary skills. This also increases cost of application development. Additionally, implementation by software requires sequential execution, which results in a prolonged communication processing time and deterioration of control performance.

The present invention has been made in an attempt to solve the above problems and provide an information processing apparatus having improved development efficiency and communication performance.

SUMMARY OF THE INVENTION

In a control network system, a master apparatus that generates a control packet is connected to a slave device that is controlled according to the control packet. The master apparatus includes a packet generation information registration unit, a packet generation unit, a communication unit, and a storage section. The packet generation information registration unit: allocates, for each control command to the slave device, a data area to the storage section which stores therein a data handled by the control command; associates an allocated address, the control command to the slave device, an identifier of the slave device targeted by the control command, and an address for data access in a storage area in the slave device, with one another; and stores the associated data in the storage section as packet generation information. The packet generation unit: selects a control command for writing a data from the master apparatus to the slave device, from among the packet generation information; references the packet generation information for each selected control command; and includes a data for write which is read from an address in the storage section corresponding to the each control command, in the control packet so as to generate the control packet. The communication unit transmits the generated control packet to the slave device.

Other features and advantages of the present invention will become more apparent from the following detailed description of the invention, when taken in conjunction with the accompanying exemplary drawings.

BRIEF DESCRIPTION OF THE DRAWINGS

FIG. 4A and FIG. 4B are configuration diagrams illustrating examples of system information and packet generation information, respectively, according to the first embodiment.

FIG. 14A and FIG. 14B are configuration diagrams illustrating examples of address association information and packet generation information, respectively, according to the second embodiment.

DETAILED DESCRIPTION OF THE EXEMPLARY EMBODIMENTS

Next are described in detail embodiments of the present invention with reference to related drawings.

A first embodiment describes a configuration in which a data structure is allocated using a physical address space.

A second embodiment describes a configuration in which a data structure is allocated using a logical address space.

Figure 1A:
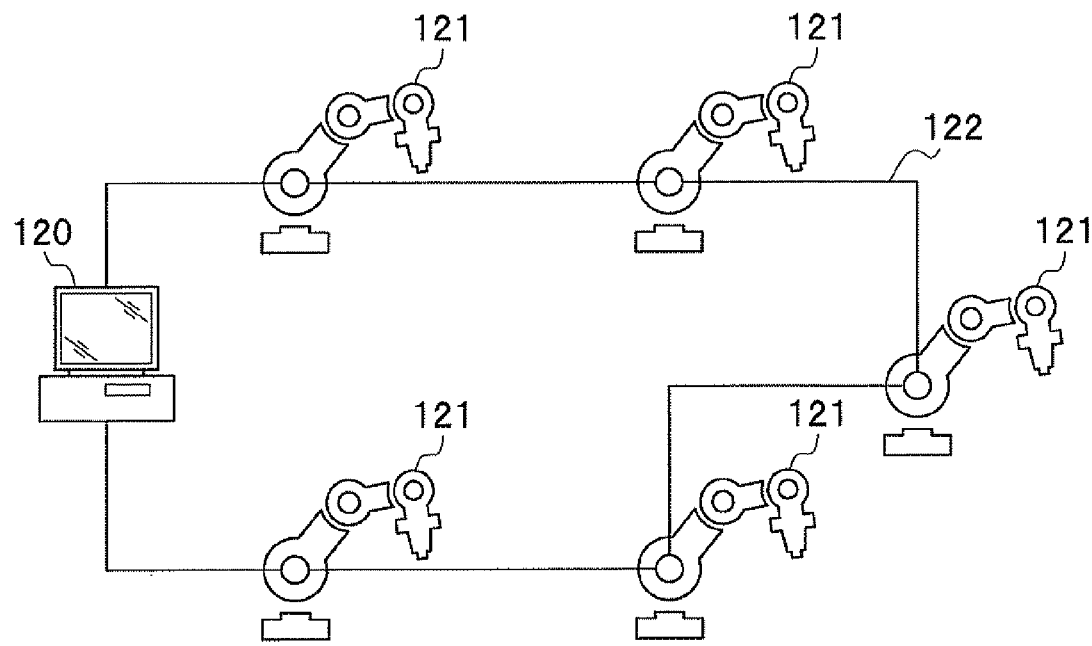
FIG. 1 is a configuration diagram illustrating a control network system according to a first embodiment of the present invention.

FIG. 1A is a configuration diagram illustrating a control network system according to a first embodiment. A control computer 120 as a master apparatus controls a controlled object 121 as a slave device, via a control network 122. The controlled object 121 is configured by, for example, a servo amplifier and a servomotor.

The control network 122 is, for example, a network of EtherCAT (registered trademark) which operates in a protocol of the Ethernet (registered trademark).

The network of EtherCAT has characteristics as follows:
A master apparatus and one or more slave devices are connected in shape of a ring. A control packet transmitted from the master apparatus reaches all of the slave devices one by one and is returned to the master apparatus;
A single control packet can include respective control data to each of a plurality of the slave devices. Thus, it is not necessary for the master apparatus to transmit and receive a packet to and from each of the slave devices. The master apparatus only has to exchange a smaller number of packets with each of the slave devices; and If the single control packet including respective control data to each of a plurality of the slave devices is transmitted from the master apparatus, the computer is sequentially transferred to the each slave device along the ring-shaped network and is then returned to the master apparatus.

Figure 1B:
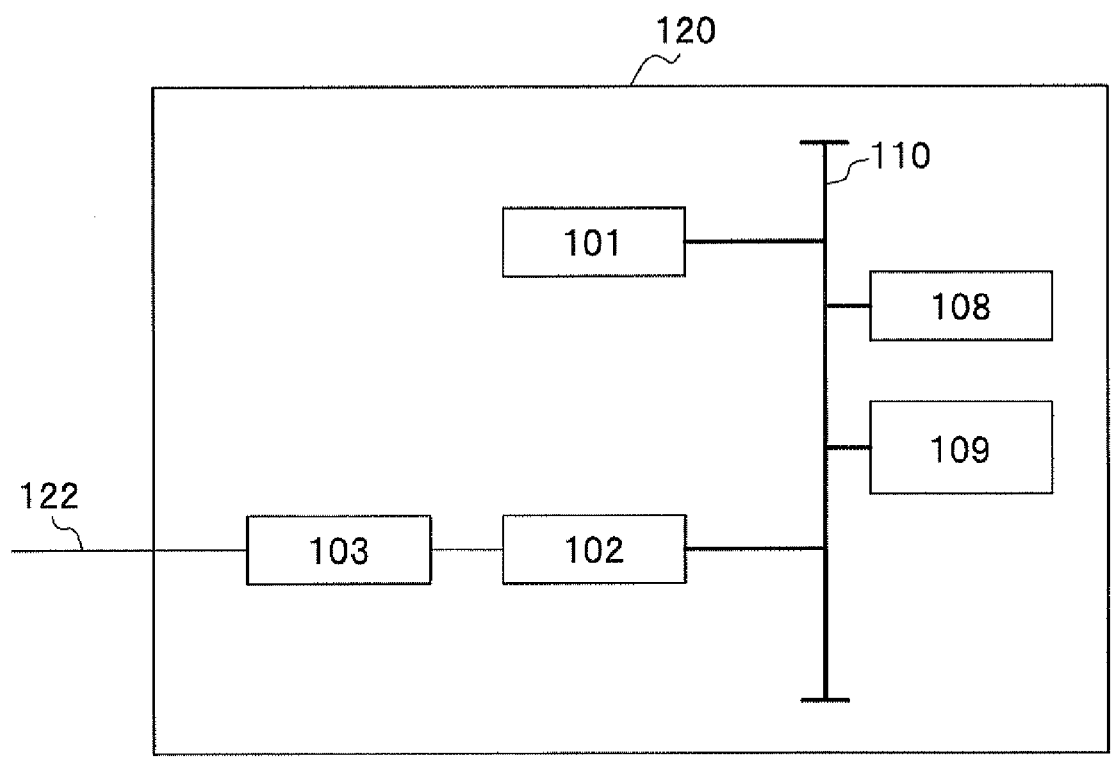

FIG. 1B is a configuration diagram illustrating a hardware configuration of a control computer 120. The control computer 120 includes a CPU 101, a communication LSI 102, a PHY (physical layer) 103, a memory 108, and a nonvolatile storage medium 109, which are internally connected to each other via a bus 110.

The CPU 101 transfers a program from the nonvolatile storage medium 109 to the memory 108 and executes the program. An execution and processing program to be used is, for example, an OS (Operating System) and an application program which operates in the OS.

The communication LSI 102 receives a communication request from a program which operates in the CPU 101 and communicates with the control network 122 using the PHY 103. The communication LSI 102 is implemented in, for example, ICs (Integrated Circuits) such as an FPGA (Field Programmable Gate Array), a CPLD (Complex Programmable Logic Device), an ASIC (Application Specific Integrated Circuit), and a gate array.

The PHY 103 is a transceiver IC capable of communicating with the control network 122. A communication standard provided by the PHY 103 is, for example, a PHY chip of the Ethernet (registered trademark). Note that, in the configuration of FIG. 1B, the PHY 103 is connected to the communication LSI 102, and a processing in a MAC (Media Access Control) layer of the Ethernet is thus included in the communication LSI 102.

Note that other configurations are also applicable in which an IC serving as MAC is placed between the communication LSI 102 and the PHY 103 or in which a communication IC having a combination of an IC serving as MAC and the PHY 103 is connected to the communication LSI 102.

The memory 108 is a temporary storage area in which the CPU 101 can operate and stores therein an OS, an application program, or the like transferred from the nonvolatile storage medium 109.

The nonvolatile storage medium 109 is an information storage medium and is used for storing a program for operating the CPU 101 and for storing a result of executing a program.

The bus 110 connects the CPU 101, the memory 108, the nonvolatile storage medium 109, and the communication LSI 102 each other. The bus 110 is, for example, a PCI (Peripheral Components Interconnect) bus, a PCI Express bus, an ISA (Industrial Standard Architecture) bus, a system bus, and a memory bus.

Figure 2:
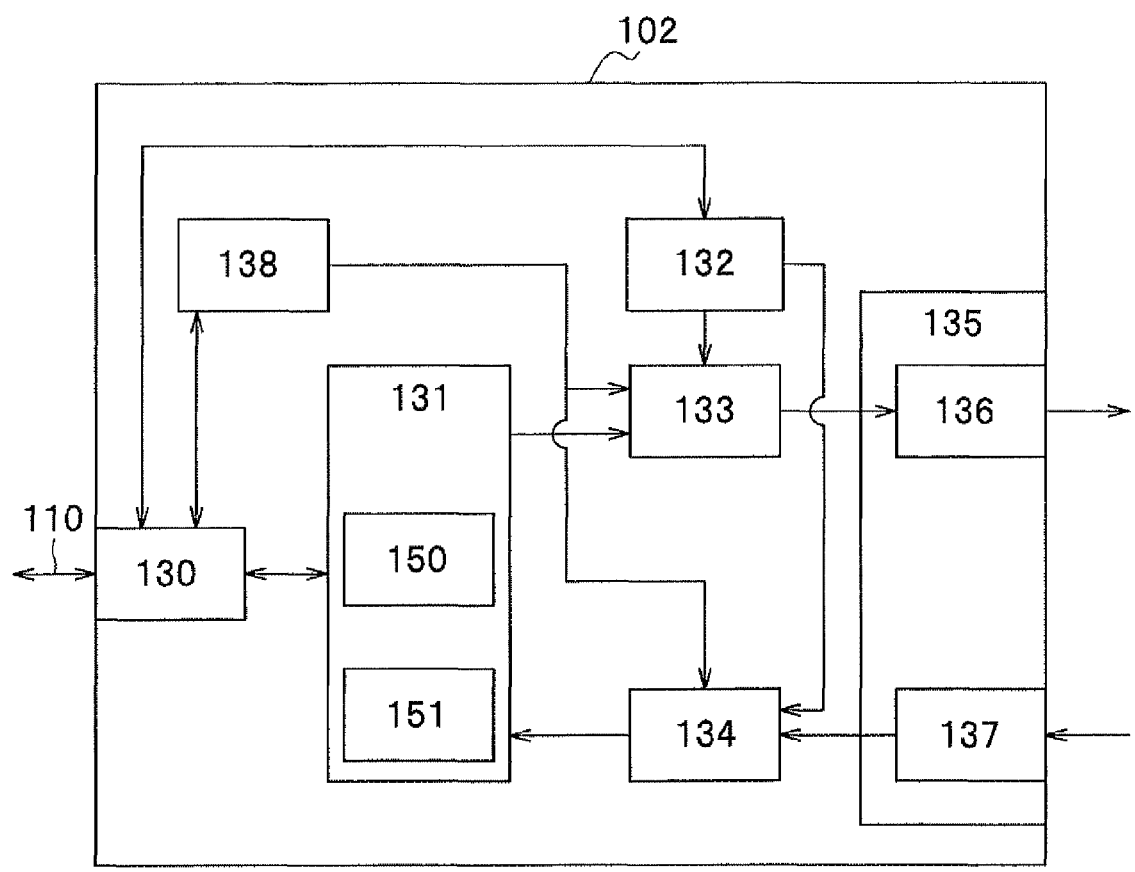
FIG. 2 is a configuration diagram illustrating a communication LSI of a control computer shown in FIG. 1 according to the first embodiment.

FIG. 2 is a configuration diagram illustrating the communication LSI 102 of the control computer 120. The communication LSI 102 includes a bus connection unit 130, a data storage unit 131, a packet generation information storage unit 132, a packet generation unit 133, a packet filter unit 134, a communication unit 135, and an operation management unit 138.

Note that the "packet" used in this embodiment is a control packet for controlling the controlled object 121 as a slave device.

In the hardware configuration of the control computer 120, the bus connection unit 130 communicates with the bus 110. The bus connection unit 130 is connected to the CPU 101 or the memory 108 according to a communication specification of the bus 110. In the communication LSI 102, the bus connection unit 130 is connected to the data storage unit 131, the packet generation information storage unit 132, and the operation management unit 138.

The bus connection unit 130 transmits and receives a data for creating a communication frame, to and from the data storage unit 131.

The bus connection unit 130 transmits and receives information for creating a communication frame from a data stored in the data storage unit 131, to and from the packet generation information storage unit 132.

The bus connection unit 130 transmits and receives a data on management setting of operations or states of the packet generation unit 133 and the packet filter unit 134, to and from the operation management unit 138.

The data storage unit 131 is configured by a combination of a storage for write unit 150 and a storage for read unit 151 so as to store a data for creating a communication frame.

The storage for write unit 150 stores a data written by the bus connection unit 130. The stored date is read by the packet generation unit 133. The storage for read unit 151 stores a data written by the packet filter unit 134. The store data is read by the bus connection unit 130.

If an access is made from outside, the storage for write unit 150 and the storage for read unit 151 each perform mutual exclusion control to the access or create a plurality of data areas inside thereof where necessary. Below is described a specific example of such a case, using the storage for write unit 150.

The data storage unit 131 is connected to the bus connection unit 130, the packet generation unit 133, and the packet filter unit 134, as a communication path of data. Herein, there is a possibility that the bus connection unit 130 and the packet generation unit 133 simultaneously make each access to the storage for write unit 150. In order to avoid access collision, for example, either of two methods as follows can be used.

In a method A, an access right management is performed. An access right is set such that, if one of the bus connection unit 130 and the packet generation unit 133 makes an access to the storage for write unit 150, an access from the other is prohibited.

In a method b, an access is orderly processed using buffering such as ring buffer. For example, a plurality of data storage areas are prepared in the storage for write unit 150 to build ring buffer. This makes it possible for the bus connection unit 130 and the packet generation unit 133 to simultaneously make each access. The number of data storage areas required for the ring buffer is determined according to relation between access rates of the two storage units.

Note that more storage areas are used in the method B than the method A. However, the method B has performance higher than that of the method A. Either of the method A or the method B is used according to conditions of storage performance or restrictions. Note that, similarly to the storage for write unit 150, the storage for read unit 151 can use the method A or the method B so as to avoid access collision.

The packet generation information storage unit 132 stores therein packet generation information 141 (to be detailed in FIG. 4B hereinafter).

The packet generation unit 133: acquires an appropriate data from the data storage unit 131 according to the packet generation information 141 read from the packet generation information storage unit 132; generates a packet for controlling the controlled object 121; and transmits the generated packet to a data transmission unit 136.

The packet filter unit 134 extracts a control data from the packet received via a data reception unit 137 and stores the control data in the data storage unit 131. Herein, a storage location and a size of a storage area of the control data in the data storage unit 131 is determined accordance with the packet generation information 141.

The communication unit 135 is connected to the control network 122 and performs communication according to a communications protocol of the control network 122. The communication unit 135 is configured by a combination of the data transmission unit 136 and the data reception unit 137. Note that, in the configuration of FIG. 1B, because the PHY 103 is provided outside the communication LSI 102, the communication unit 135 corresponds to a processing section of a MAC layer. However, the PHY 103 may be configured as an Ethernet communication device including the MAC layer and PHY layer. Or, the communication LSI 102 may serve as PHY.

The data transmission unit 136 serves as a transmitting section in the communication unit 135 and transmits a packet from the control computer 120 to the control network 122.

The data reception unit 137 serves as a receiving section in the communication unit 135 and receives a packet transmitted from the control network 122.

The operation management unit 138 is configured by a functional register or the like. The operation management unit 138 presents management of operations or states of the packet generation unit 133 and the packet filter unit 134 to the bus 110. A program running on the CPU 101 controls operations of the packet generation unit 133 and the packet filter unit 134 by accessing to the functional register of the operation management unit 138 via the bus 110, and acquires states of the controlled operations. Data or information which the operation management unit 138 can set or acquire includes a timing of a packet communication performed by the packet generation unit 133 and information necessary for generating a packet.

Figure 3:
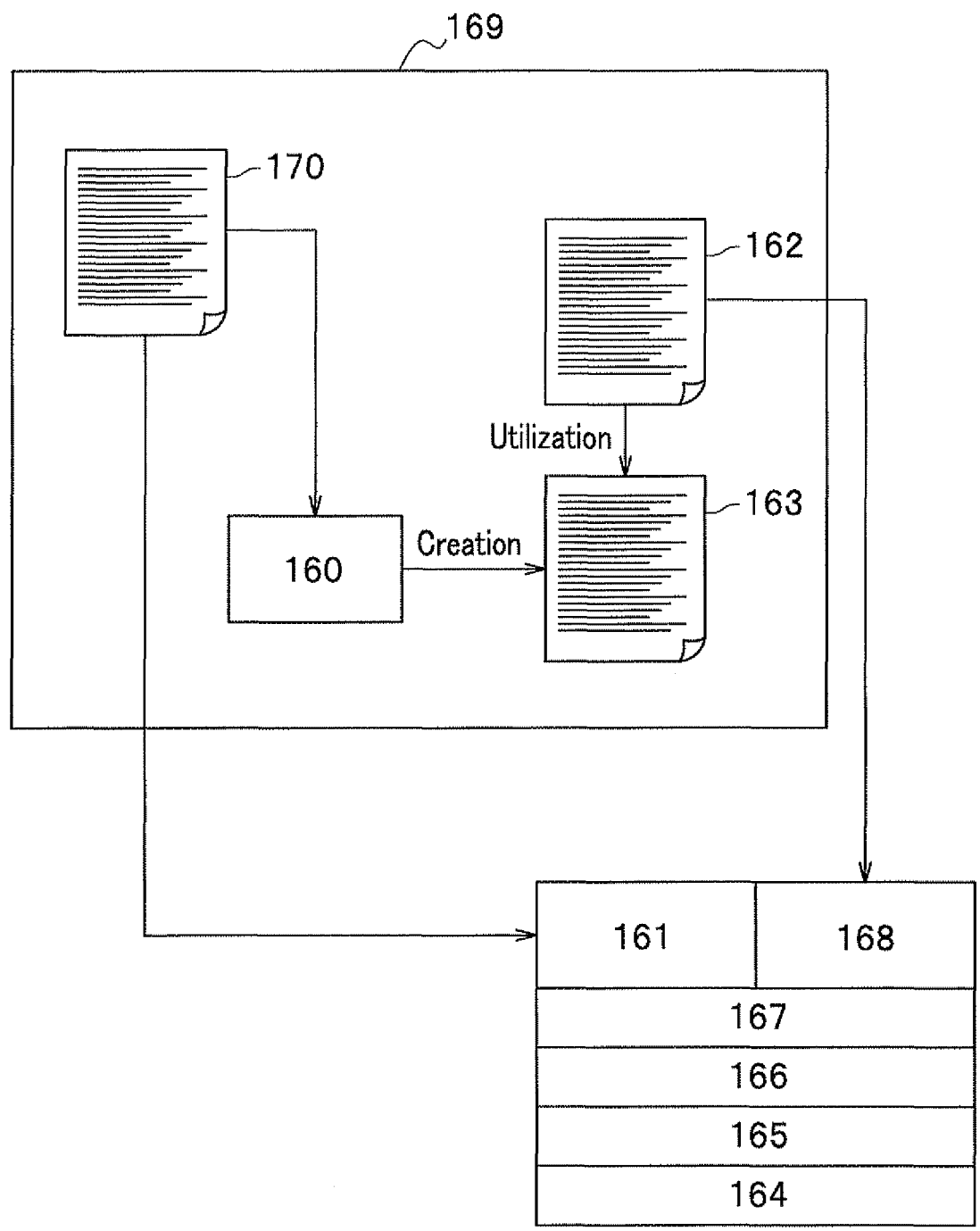
FIG. 3 is a configuration diagram illustrating a development computer according to the first embodiment.

FIG. 3 is a configuration diagram illustrating a development computer 169. The development computer 169 is configured as a computer having a hardware configuration including the CPU 101 as shown in FIG. 1B or the like. The development computer 169 and the control computer 120 may be configured as two computers in one housing or in separate housings.

The development computer 169 includes a control instruction structure unit 160 as a processing section. The development computer 169 has system information 170, a program source 162, and a control instruction structure 163 as data in a storage section thereof.

Herein, the control computer 120 (FIG. 1B) operates for itself an OS 164, a device driver 165, a library 166, an API 167, an application 168, and a packet generation information registration unit 161.

However, the control instruction structure unit 160, the program source 162, the control instruction structure 163, and the system information 170 may be provided and operated in the control computer 120, or in the development computer 169 which is provided separately from the control computer 120.

Also, the development computer 169 may not be necessarily a single computer and may be configured by, for example, one computer in which the control instruction structure unit 160 is operated and another in which the application 168 is developed using the program source 162.

The control instruction structure unit 160 analyzes information on a controlled object 121 defined by the system information 170 and a control network 122 to thereby generate the control instruction structure 163.

The packet generation information registration unit 161 also analyzes the information on the controlled object 121 defined by the system information 170 and the control network 122 to thereby register the packet generation information 141 in the packet generation information storage unit 132, utilizing access provided by the device driver 165.

The program source 162 is a source code of a program using the control instruction structure 163. The program source 162 is compiled so as to serve as the application 168. Note that this embodiment describes a compiler language which becomes executable by compiling. However, as an executable form of a program source, an interpreter language may be used in which a program source is interpreted upon execution and is sequentially executed.

The control instruction structure 163 shows a structure of the data storage unit 131 of the communication LSI 102. Some specific examples of the control instruction structure 163 are a structure definition and a union definition of C language.

The OS 164 provides basic functions such as program management and access to hardware. The OS 164 is not always necessary but is preferably used because it provides the basic functions for using a general-purpose application and an existing software asset and performing task management. A real-time OS is also preferably used in which task scheduling is executable according to time restrictions.

The device driver 165 makes access to a data area, operation management information, and state information which are available at the communication LSI 102 via the bus 110, using an access means to hardware provided by the OS 164. The device driver 165 may or may not be part of the OS 164.

The library 166 includes therein a frequently-used function and provides basic operations such as memory management, task management, input/output, and file operation, using the OS 164. A specific example of the library 166 is "glibc" used in Linux (registered trademark).

The API 167 is a software interface for using the device driver 165 or the OS 164, via the library 166.

The application 168 is a software which computes a control instruction for controlling the controlled object 121 and executes transmission and receipt of a communication packet using the communication LSI 102.

FIG. 4A is a diagram illustrating an example of the system information 170. The system information 170 is constituted by one or more control instruction items 171 (which correspond to one or more rows of the diagram). Each of the control instruction items 171a, 171b, 171c includes a control instruction name 172, a command 173, a slave identifier 174, an address 175, an input/output direction 176, and a size 177.

The control instruction name 172 shows which meaning and name a given data area has as a control instruction. The command 173 shows a command of a telegram of EtherCAT (registered trademark) corresponding to a given data area.

TABLE 1

| | 173 Command | |
|---|---|---|
| Abbreviation | Original Word | Brief Description |
| APRD | Auto-increment Physical Read | Addressing according to connection order of slaves |

TABLE 1-continued

173 Command

| Abbreviation | Original Word | Brief Description |
|---|---|---|
| APWR | Auto-increment Physical Write | |
| APRW | Auto-increment Physical Read and Write | |
| FPRD | Configured-address Physical Read | Arbitrary addressing set by master |
| FPWR | Configured-address Physical Write | |
| FPRW | Configured-address Physical Read and Write | |
| BRD | Broadcast Read | Command to all slaves (Not necessary to specify slave identifier because all slaves are targeted) |
| BWR | Broadcast Write | |
| BRW | Broadcast Read and Write | |
| LRD | Logical Read | Command to logical address space |
| LWR | Logical Write | |
| LRW | Logical Read and Write | |
| ARMW | Auto-increment Physical Read/ Multiple Write | Command which takes slave identifier and address as arguments, reads to specified slave, and writes to the other slave. Addressing according to order of slaves. |
| FRMW | Configured-address Physical Read/ Multiple Write | Command which takes slave identifier and address as arguments, reads to specified slave, and writes to the other slave. Arbitrary addressing set by master. |

Table 1 lists abbreviated names to be selected as the command 173. If the command 173 has the last character of "W" of the abbreviated name, it is a command for write. If the last character of "R", a command for read. And, if the last character of "RW", a command for both read and write. Note that the terms "read" and "write" will be defined hereinafter in describing the input/output direction 176.

Referring back to FIG. 4A, the slave identifier 174 of the system information 170 is an identifier of a slave. However, some commands do not require the slave identifiers 176. For example, commands (LRD, LWR, LRW) corresponding to logical addresses such as the control instruction items 171a, 171b do not require the slave identifiers 174.

The address 175 is a physical address or a logical address (in case of command corresponding to a logical address) in a storage section in a slave device corresponding to the slave identifier 174.

The input/output direction 176 shows whether a generated packet is for read, write, or read/write. Note that, in this embodiment, the term "write" means that a data present in a storage area of a master is copied in a storage area of a slave. The term "read" means that a data present in a storage area of a slave is copied in a storage area of a master.

The size 177 shows a size of a given data area.

FIG. 4B is a diagram illustrating an example of the packet generation information 141. The packet generation information 141 includes a command 142, an address 143, a slave identifier 144, a physical/logical address 145, an input/output direction 146, and a size 147. As shown below, respective data in a record of the packet generation information 141 other than the address 143 are copied from a corresponding data of the system information 170.

The command 142 is a data copied from the command 173 and is a command in a telegram of EtherCAT (registered trademark).

The address 143 is a data showing a result of a data allocation processing and indicates a location of a data area of a packet generated from the packet generation information 141, in the data storage unit 131.

The slave identifier 144 is an identifier of a slave and is copied from the slave identifier 174. However, some commands do not require the slave identifiers 174. For example, commands (LRD, LWR, LRW) corresponding to logical addresses do not require the slave identifiers 174.

The physical/logical address 145 is a data copied from the address 175 and is a physical address or a logical address (in case of a command corresponding to a logical address) in a given slave.

The input/output direction 146 is a data copied from the input/output direction 176 and shows whether a generated packet is for read, write, or read/write. Note that the item of the input/output direction 146 is necessary because the command 142 does not uniquely determine whether a give packet is for read, write, or read/write. The input/output directions 176 of LRD, LWR, LRW commands are determined as read, write, and read/write, respectively. The input/output directions 176 of ARMW and FRMW commands are both determined as write.

The size 147 is a data copied from the size 177 and shows a size of a data area of a generated packet.

FIG. 5 to FIG. 8 are flowcharts each illustrating steps in which the packet generation information registration unit 161 allocates a data structure to the data storage unit 131.

Figure 5:
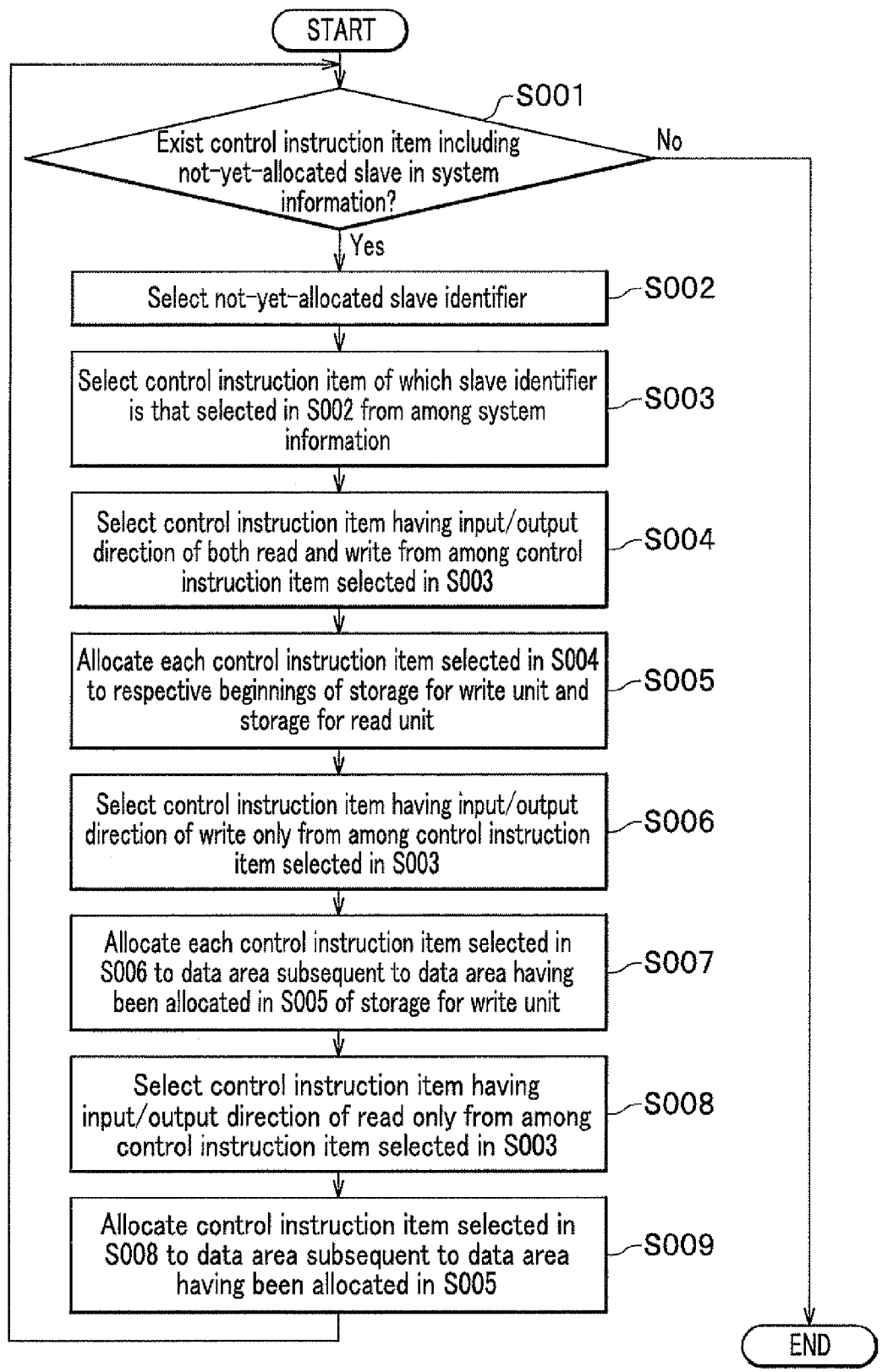
FIG. 5 is a flowchart illustrating steps in which a packet generation information registration unit allocates a data structure to a data storage unit according to the first embodiment.

FIG. 5 is a flowchart illustrating steps of a processing in which, if a data structure is allocated for each slave identifier 174, a data area having the input/output direction 176 of only write in the storage for write unit 150 and a data area having the input/output direction 176 of only read in the storage for read unit 151 are subjected to the allocation starting from the same start address.

Figure 6:
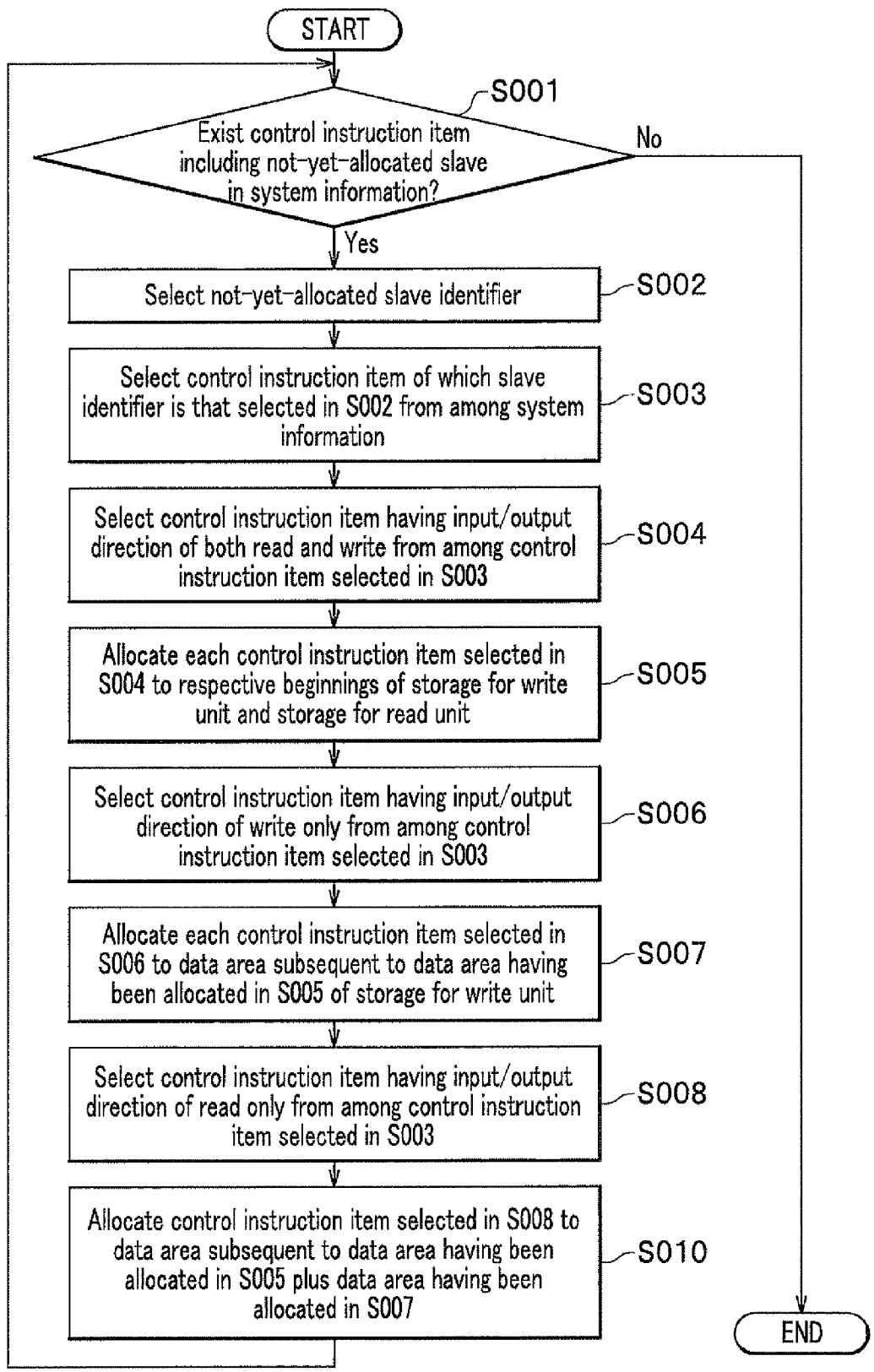
FIG. 6 is another flowchart illustrating steps in which the packet generation information registration unit allocates a data structure to the data storage unit according to the first embodiment.

FIG. 6 is a flowchart illustrating steps of a processing in which, if a data structure is allocated for each slave identifier 174, a data area having the input/output direction 176 of only write in the storage for write unit 150 and a data area having the input/output direction 176 of only read in the storage for read unit 151 are subjected to the allocation starting from respective start addresses different from each other.

Figure 7:
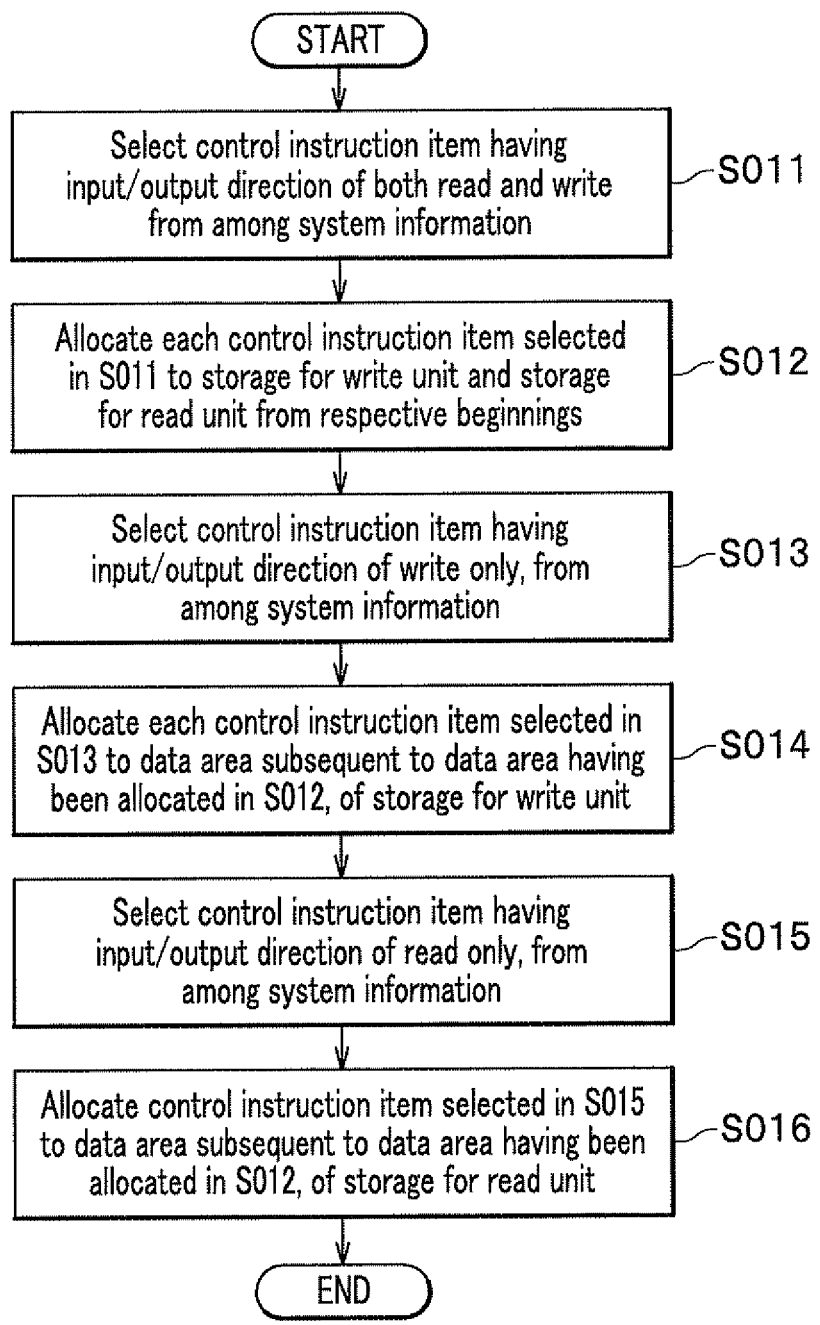
FIG. 7 is a still another flowchart illustrating steps in which the packet generation information registration unit allocates a data structure to the data storage unit according to the first embodiment.

FIG. 7 is a flowchart illustrating steps of a processing in which, if a data structure is allocated for each input/output direction 176, a data area having the input/output direction 176 of only write in the storage for write unit 150 and a data area having the input/output direction 176 of only read in the storage for read unit 151 are subjected to the allocation starting from the same start address.

Figure 8:
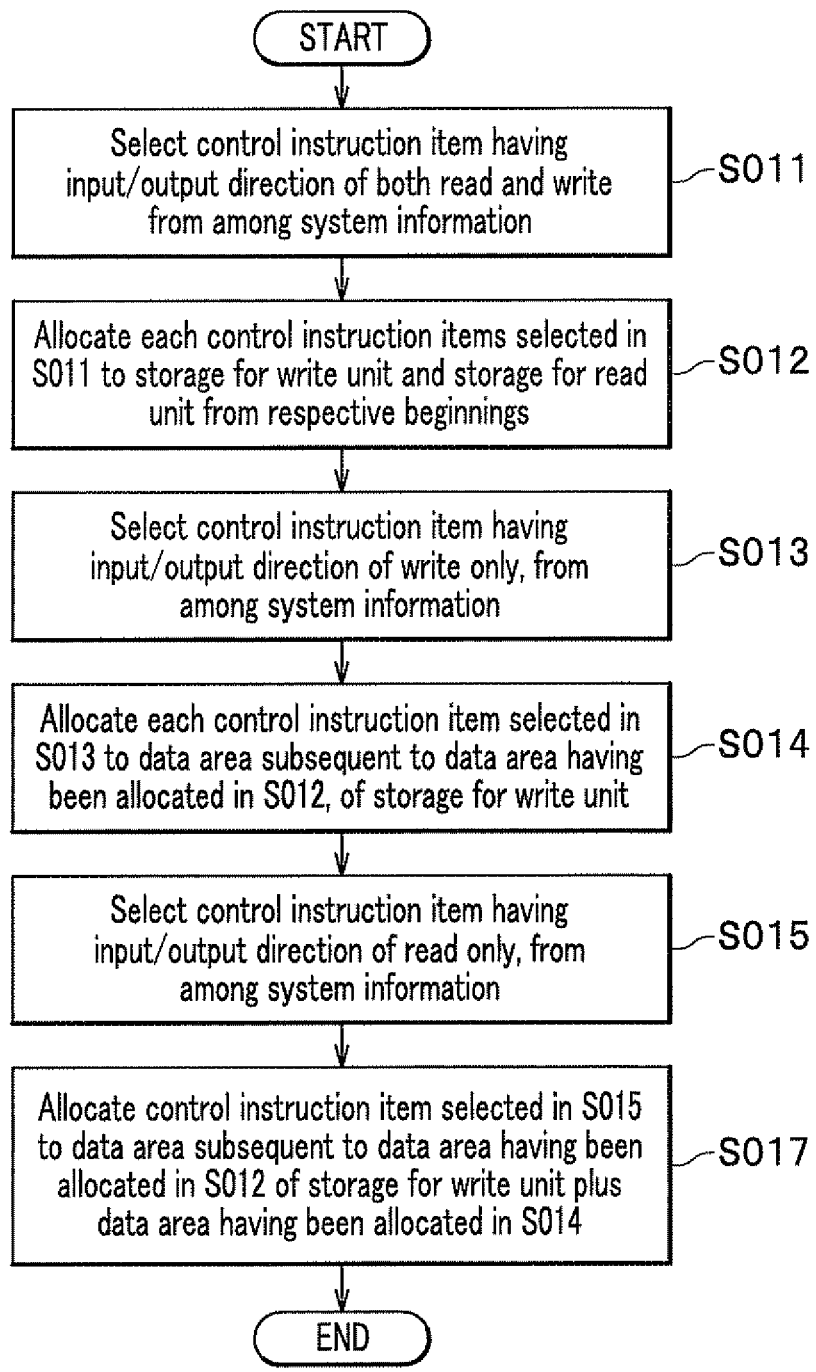
FIG. 8 is a yet still another flowchart illustrating steps in which the packet generation information registration unit allocates a data structure to the data storage unit according to the first embodiment.

FIG. 8 is a flowchart illustrating steps of a processing in which, if a data structure is allocated for each input/output direction 176, a data area having the input/output direction 176 of only write in the storage for write unit 150 and a data area having the input/output direction 176 of only read in the storage for read unit 151 are subjected to the allocation starting from respective start addresses different from each other.

Next is described the flowchart of FIG. 5. Note that a subject which performs the steps of the flowchart of FIG. 5 is the packet generation information registration unit 161.

In S001, from among the system information 170, whether or not there exists the control instruction item 171 including the slave identifier 174 which has not yet allocated a data structure to the data storage unit 131 is determined. If there is no such not-yet-allocated control instruction item 171 (if No in S001), the processing of FIG. 5 is terminated.

In S002, if there still exists the not-yet-allocated control instruction item 171 (if Yes in S001), a not-yet-allocated slave identifier corresponding thereto is selected. A slave having the slave identifier 174 selected in S002 is hereinafter referred to as a selected slave.

In S003, any control instruction items 171 of which slave identifiers 174 are owned by the slaves selected in S002 from among the system information 170, are selected.

Note that all of those control instruction items 171 are selected in S003. However, a developer may arbitrarily select any of the control instruction items 171. In this case, to the selected control instruction item 171 of the system information 170 is added an attribute which indicates whether allocation of a data structure from the control instruction item 171 and/or generation of packet generation information is enabled or disabled. Thus, the attribute is enabled or disabled is another example for determining which data is to be selected from among the control instruction item 171 in S003.

In S004, from among the control instruction items 171 selected in S003, any control instruction item 171 that has the input/output direction 176 of both read and write is selected.

In S005, a data area of each of the selected control instruction item 171 is sequentially allocated to respective beginnings of the storage for write unit 150 and the storage for read unit 151 according to a size of the data area.

In S006, from among the control instruction items 171 selected in S003, any control instruction item 171 that has the input/output direction of write only is selected.

In S007, a data area of the control instruction item 171 each selected in S006 is sequentially allocated to a data area subsequent to the data area having been allocated in S005, of the storage for write unit 150 according to a size of the data area.

In S008, from among the control instruction items 171 selected in S003, any control instruction item 171 having the input/output direction of read only is selected.

In S009, a data area of the control instruction item 171 each selected in S008 is sequentially allocated to a data area subsequent to the data area having been allocated in S005, of the storage for read unit 151, according to a size of the data area.

Note that steps S006 to S007 and steps S008 to S009 can be performed in any order or simultaneously.

A difference between the flowchart of FIG. 6 and the flowchart of FIG. 5 is the same as a difference between S009 and S010. In S010, a data area of the control instruction item 171 each selected in S008 is sequentially allocated, according to the size of the data area, to a data area subsequent to the data area having been allocated in S005 of the storage for read unit 151 plus the data area having been allocated in S007 of the storage for write unit 150. This makes it possible to allocate the data area in the storage for write unit 150 in which the input/output direction 176 is only "read" and the data area in the storage for read unit 151 in which the input/output direction 176 is only "write", from respective start addresses different from each other.

Next is described a flowchart of FIG. 7.

In S011, from among the system information 170, any control instruction item 171 that has the input/output direction 176 of both read and write is selected.

In S012, a data area of each of the selected control instruction items 171 is sequentially allocated to respective beginnings of the storage for write unit 150 and the storage for read unit 151 according to a size of the data area.

In S013, from among the system information 170, any control instruction item 171 that has the input/output direction of read only is selected.

In S014, a data area of the control instruction item 171 each selected in S013 is sequentially allocated to a data area subsequent to the data area having been allocated in S012, of the storage for write unit 150 according to a size of the data area.

In S015, from among the system information 170, any control instruction item 171 having the input/output direction of read only is selected.

In S016, a data area of the control instruction item 171 each selected in S015 is sequentially allocated to a data area subsequent to the data area having been allocated in S012, of the storage for read unit 151, according to a size of the data area.

Note that steps S013 to S014 and steps S015 to S016 can be performed in any order or simultaneously.

A difference between the flowchart of FIG. 8 and the flowchart of FIG. 7 is the same as a difference between S016 and S017. In S017, a data area of the control instruction item 171 each selected in S015 is sequentially allocated, according to the size of the data area, to a data area subsequent to the data area having been allocated in S014 of the storage for read unit 151 plus the data area having been allocated in S015 of the storage for write unit 150. This makes it possible to allocate the data area in the storage for write unit 150 in which the input/output direction 176 is only "read" and the data area in the storage for read unit 151 in which the input/output direction 176 is only "write", from respective start addresses different from each other.

Figure 9A:
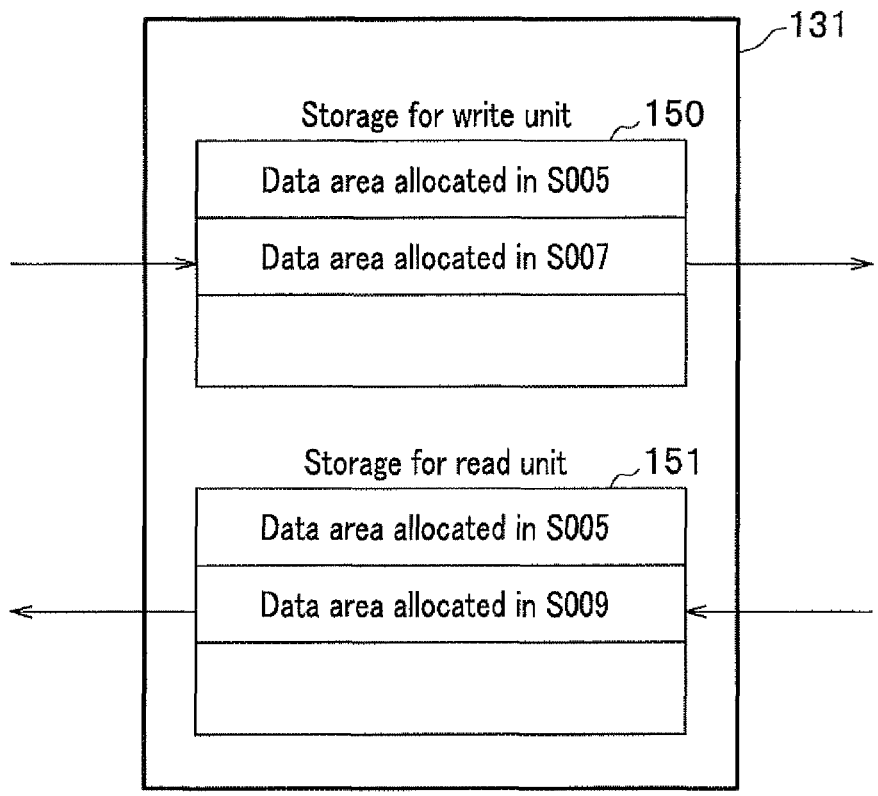
FIG. 9A and FIG. 9B are explanatory diagrams illustrating a data storage unit to which allocation has been performed using steps of FIG. 5 and FIG. 6, respectively, according to the first embodiment.
Figure 9B:
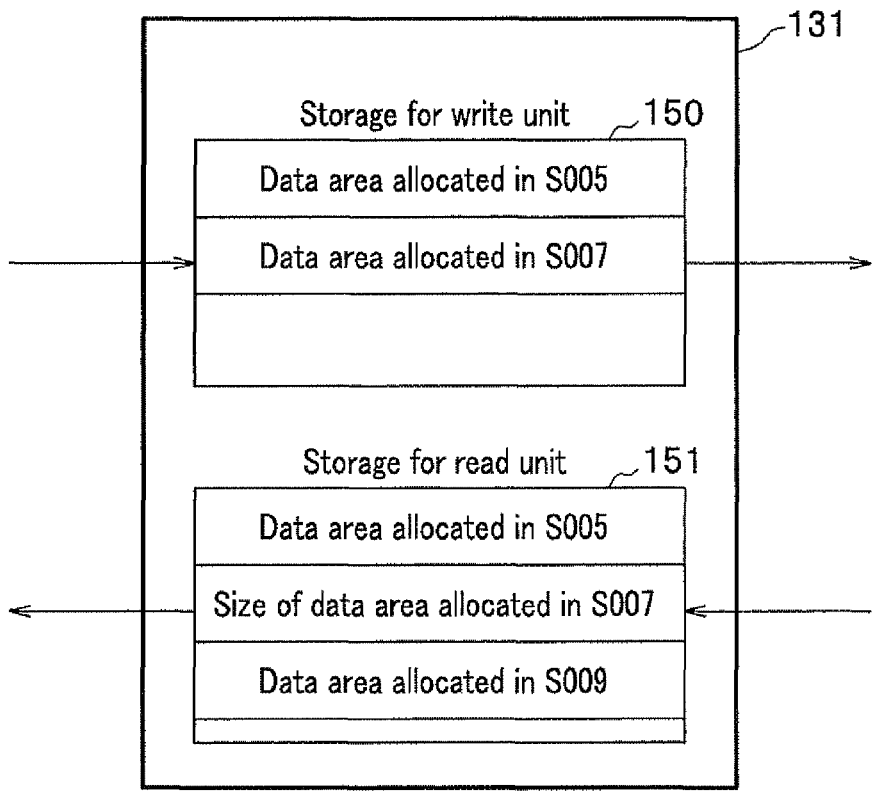

FIG. 9A illustrates the data storage unit 131 allocated using the steps of FIG. 5. FIG. 9B illustrates the data storage unit 131 allocated using the steps of FIG. 6. In FIG. 9B, there is an empty data area as large as the "size of the data area allocated in S007" in the storage for read unit 151. This means that a start address of "the data area allocated in S007" of the storage for write unit 150 is different from a start address of the "data area allocated in S009" of the storage for read unit 151.

Figure 10A:
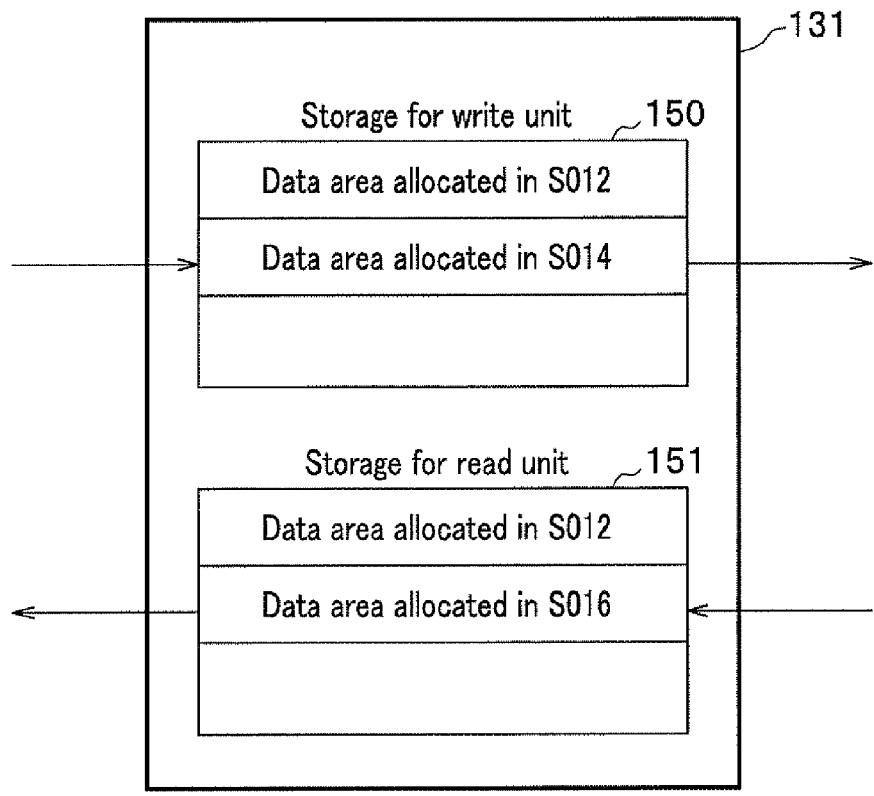
FIG. 10A and FIG. 10B are explanatory diagrams illustrating a data storage unit to which allocation has been performed using steps of FIG. 7 and FIG. 8, respectively, according to the first embodiment.
Figure 10B:
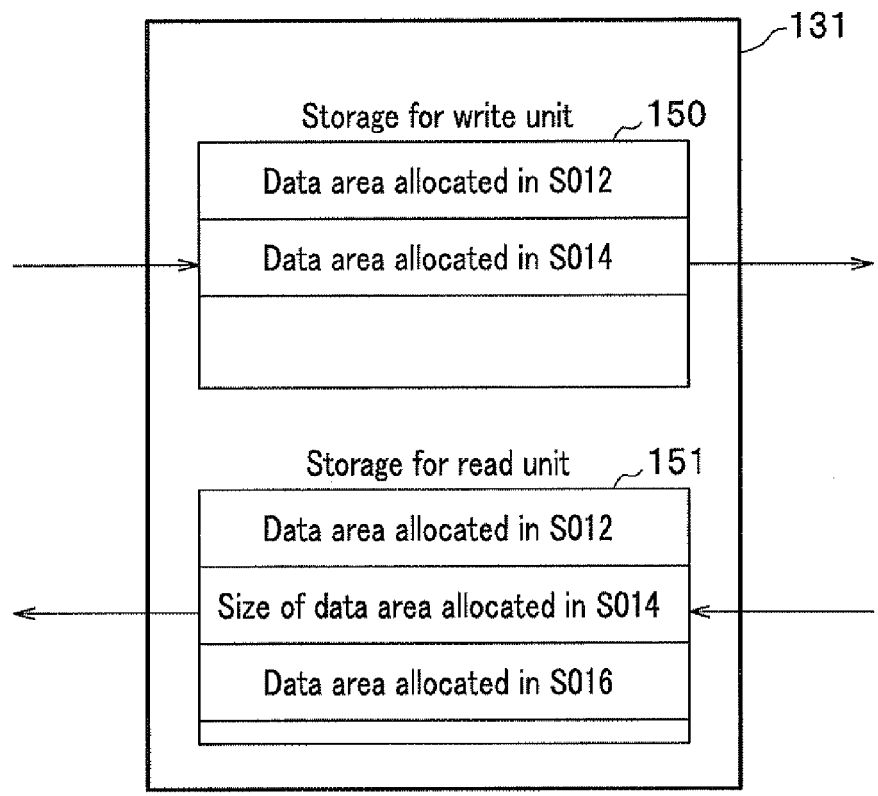

FIG. 10A illustrates the data storage unit 131 subjected to the allocation using the steps of FIG. 7. FIG. 10B illustrates the data storage unit 131 subjected to the allocation using the steps of FIG. 8. In FIG. 10B, there is an empty data area as large as the "size of the data area allocated in S014" in the storage for read unit 151. This means that a start address of "the data area allocated in S014" of the storage for write unit 150 is different from a start address of the "data area allocated in S016" of the storage for read unit 151.

Using the steps of FIG. 5 to FIG. 8 as described above, the packet generation information registration unit 161 allocates the data area of each record in the system information 170 to the data storage unit 131.

The packet generation information registration unit 161 then generates the packet generation information 141 from the system information 170. As described in FIG. 4B, the packet generation information registration unit 161 copies the data of the packet generation information 141 other than the address 143 from the corresponding data of the system information 170 and writes an address resultant from the allocation shown in FIG. 9 and FIG. 10, at the address 143 of the packet generation information 141.

The packet generation information registration unit 161 registers the generated packet generation information 141 in the packet generation information storage unit 132 via the API 167.

Figure 11:
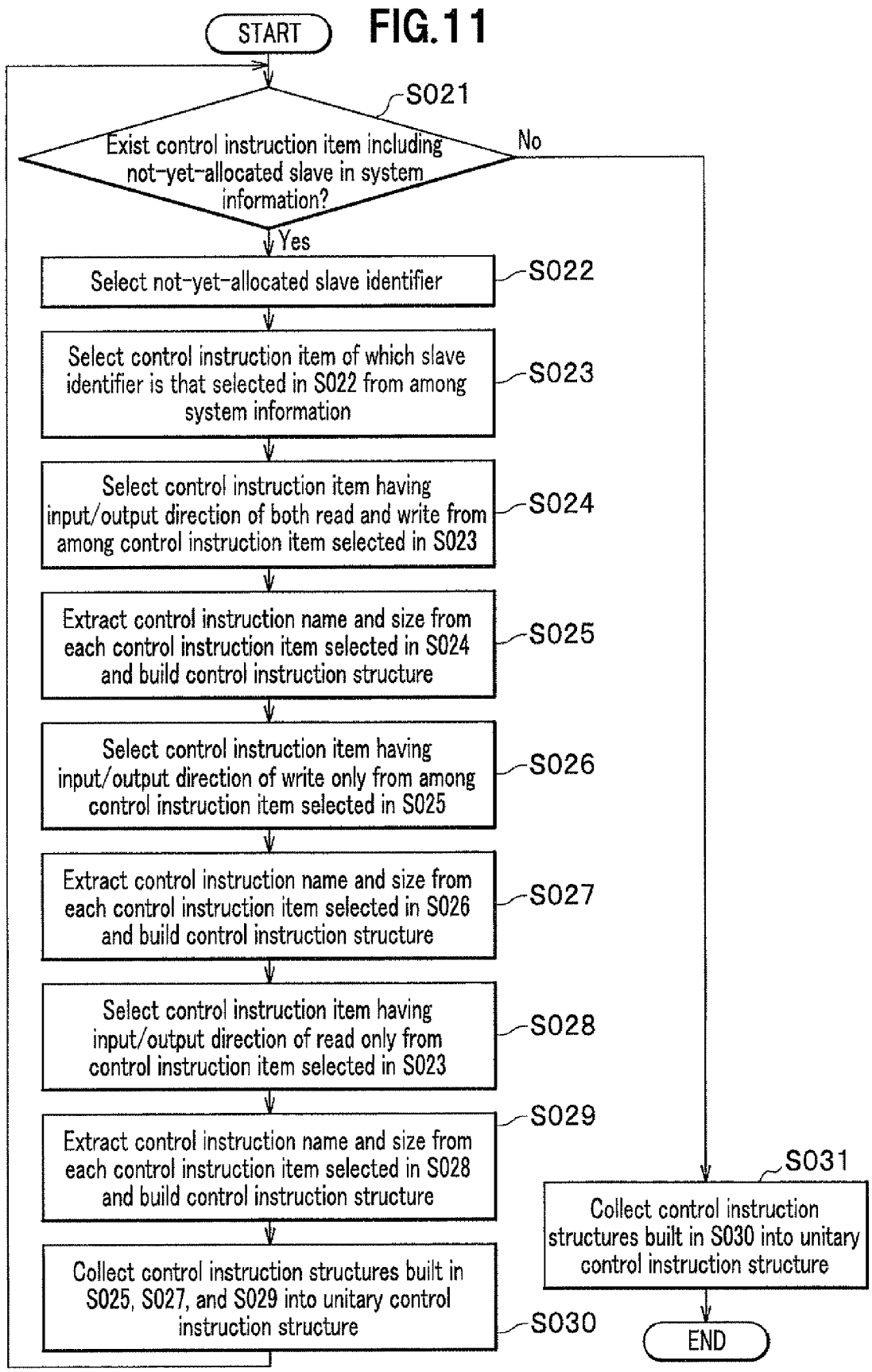
FIG. 11 is a flowchart illustrating steps in which a control instruction structure unit allocates a data structure to a data storage unit and creates a control instruction structure, according to the first embodiment.

FIG. 11 is a flowchart illustrating steps in which the control instruction structure unit 160 allocates a data structure to the data storage unit 131 and creates the control instruction structure 163.

Similarly to FIG. 5, FIG. 11 illustrates steps in which, in allocating a data structure for each slave identifier 174, the data structure is allocated from the same start address to both a data area in the storage for write unit 150 of which input/output direction 176 is "write" only and an area in the storage for read unit 151 of which input/output direction 176 is "read" only.

In allocating a data structure to the data storage unit 131, steps from S021 to S029 of FIG. 11 correspond to steps from S001 to S009 of FIG. 5. Note that a result obtained from the allocation of a data structure is herein written out not to the "address 143 of the packet generation information 141" but to the "built control instruction structure 163".

The control instruction structure 163 includes, for example, a structure of C language having the control instruction name 172 as a variable name and the size 177 as a variable type, a union definition, and a class definition of an object-oriented language.

As the control instruction structure 163, for example, a structure of C language as follows is generated from the system information 170 of FIG. 4A:

```
struct Cnn_command{
    int position;
    int speed;
    int torque;
}
```

Herein, the variable name (such as "position") is that the control instruction name 172 is represented in lower-case letters. The data type ("int" which means a 4-byte integer type) is determined from the size 177. The API 167 for accessing to the structure is, for example, as follows:

void set_position(struct_Cnn command*com,int value);
void get_position(struct_Cnn command*com);

The first line represents an API which assigns a specified value to the position variable. The second line represents an API which acquires a value from the position variable.

Note that, owing to restrictions of C language, for example, the control instruction name 172 of the control instruction structure 163 is written in English, and a space, a tab character, or the like is replaced with an underscore ("_"). If the size 177 is larger than a variable type defined by C language or does not correspond with a size of a given variable type, an array-based definition is made, for example.

In some cases where the control instruction structure 163 is built, the control instruction structure 163 needs to be made into the same specific size due to restrictions of a software environment running on the CPU 101, a compiler for generating the application 168, or the like. For example, if the size 177 is not in terms of bytes, several bits of a value of "0" are added to the size 177. This allows the size 177 to be represented in terms of bytes and the control instruction structure 163 to be subjected to allocation of a data area. In another case where the CPU 101 is of 32-bit type, depending on a compiler, components (control instructions) of a structure are arrayed by the 4-byte. In this case, the library 166 and the API 167 are made to absorb a difference between allocation of the control instruction structure 163 and allocation of the data storage unit 131. Alternatively, data structures are allocated to the data storage unit 131 such that data areas thereof are consistent with one another.

In S030, the control instruction structures 163 built in S025, S027, and S029 are collected into one control instruction structure 163, as a unitary control instruction structure 163 corresponding to the slave selected in S022. Herein, the collected control instruction structure 163 is built so as to have a data structure same as that allocated to the data storage unit 131 by the packet generation information registration unit 161 using the steps of FIG. 5.

Note that when a data structure is allocated to the data storage unit 131 and the control instruction structure 163 is built in S027 and S029, the data area having the input/output direction 176 of write only in the storage for write unit 150 has a beginning address location same as that of the data area having the input/output direction 176 of read only in the storage for read unit 151. Thus, if the control instruction structure 163 is built, a method of specifying the same area is required. One of such specific examples is a union of C language.

In S031, if there is no slave which has not yet been subjected to the allocation in S021 (if No in S021), the control instruction structures 163 built for each slave are collected into a unitary control instruction structure 163. Also in this case, the unitary control instruction structure is built so as to have a data structure same as that allocated to the data storage unit 131 by the packet generation information registration unit 161 using the steps of FIG. 5.

Figure 12:
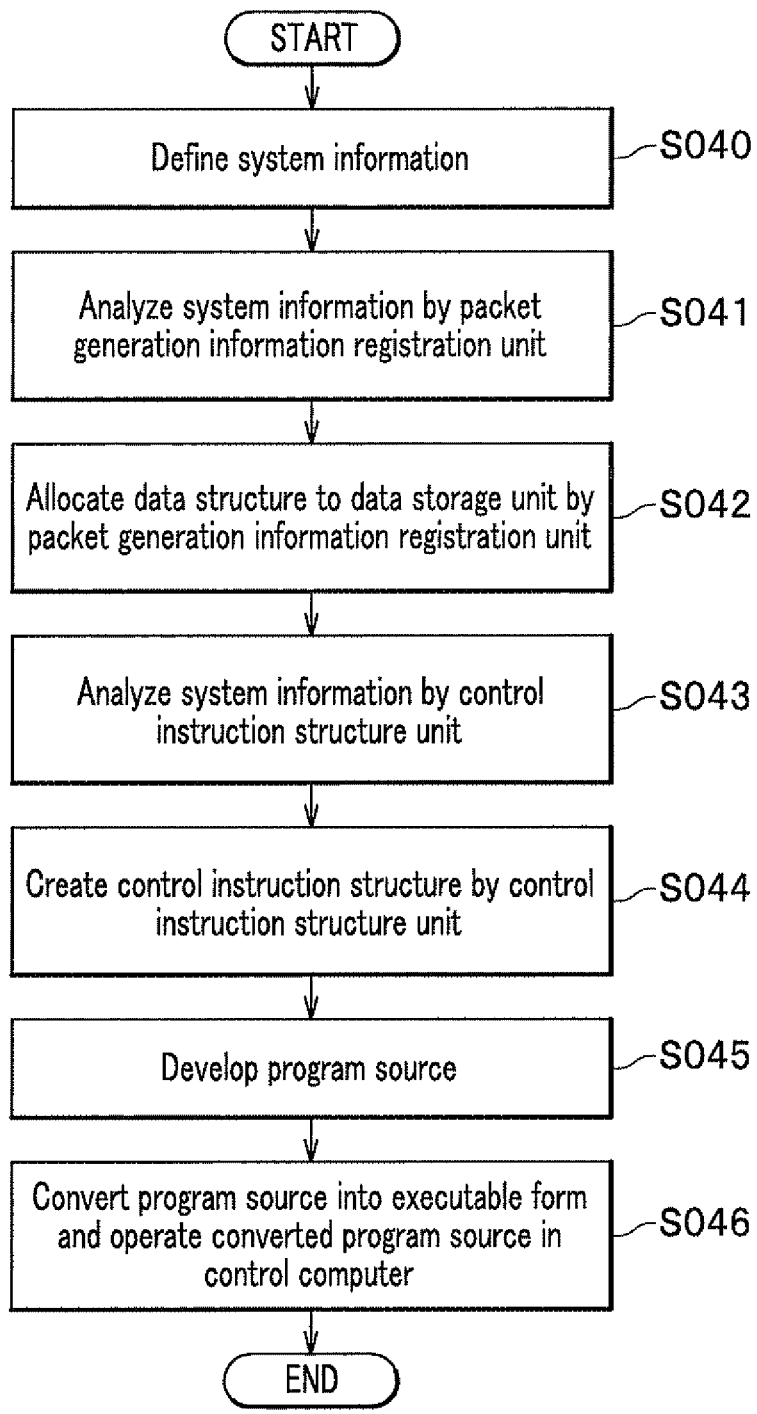
FIG. 12 is a flowchart illustrating steps of developing an application executed by a development computer according to the first embodiment.

FIG. 12 illustrates steps of developing the application 168 which is executed by the development computer 169.

In S040, the development computer 169 receives an input of the system information 170 defined by the developer.

In S041, upon an instruction from the developer, the development computer 169 invokes an instruction of making the packet generation information registration unit 161 analyze the system information 170.

In S042, the packet generation information registration unit 161 allocates a data structure to the data storage unit 131 and writes a result of the allocation to the packet generation information 141 (details of which are described in the steps of any of the flowcharts of FIG. 5 to FIG. 8, and which flowchart is to be executed is determined by, for example, a selection or an entry from the developer).

In S043, upon an instruction from the developer, the development computer 169 invokes an instruction of making the control instruction structure unit 160 analyze the system information 170.

In S044, the control instruction structure unit 160 allocates a data structure to the data storage unit 131 and creates the control instruction structure 163 based on a result of the allocation (details of which is described in the processing shown in the flowchart of FIG. 11 or the like).

In S045, the development computer 169 receives an input of the program source 162 from the developer. The program source 162 is created using the control instruction structure 163 in S044 and the API 167.

In S046, upon an instruction from the developer, the development computer 169 converts (by compiling, byte-code conversion, or the like) the program source 162 into an executable form and makes a result obtained from the conversion (such as a binary file) operate on the control computer 120.

Note that the API 167 includes an API which associates the control instruction structure 163 with a data structure of the data storage unit 131. One of specific examples of such an API is a mmap function which is a system call of UNIX (registered trademark). The API 167 also includes an API which reads and writes the control instruction structure 163. In such an API, a processing of aligning a byte boundary of a data structure, or a consistency between a control instruction structure of setting an instruction value and an input/output direction is verified.

The API 167 also includes an API which, instead of reading and writing an instruction value directly from and to the data storage unit 131 associated with a mmap function or the like, builds the control instruction structure 163 in the memory 108, brings together all of the built control instruction structures 163, and makes the data storage unit 131 read and write the brought-together result.

That is, a main difference between the packet generation information 141 and the control instruction structure 163 is that the packet generation information 141 associates each variable (that is, each record of FIG. 4B) with one address 143, and, on the other hand, the control instruction structure 163 associates each structure which is obtained by grouping together one or more variables, with one start address of the data storage unit 131. As described, a processing is performed using the structure which is a large data block as a unit, which can reduce the number of addresses to be managed.

The API 167 also includes an API which makes the communication LSI 102 transmits a packet and an API which receives a packet from the communication LSI 102.

A data area which is allocated into the data storage unit 131 as a data structure may be not a control instruction or a result after control but a frame image or a mailbox command. In this case, the application 168 cannot be developed using the control instruction structure 163. However, a communications protocol can be operated, not in a computation of a control instruction but in an application.

Next is described the second embodiment. The second embodiment differs from the first embodiment in that a data structure is allocated to the data storage unit 131 using a logical address space. Except that, the second embodiment basically has the same configuration and operations as those of the first embodiment. Description hereinafter is made especially featuring the difference.

Figure 13:
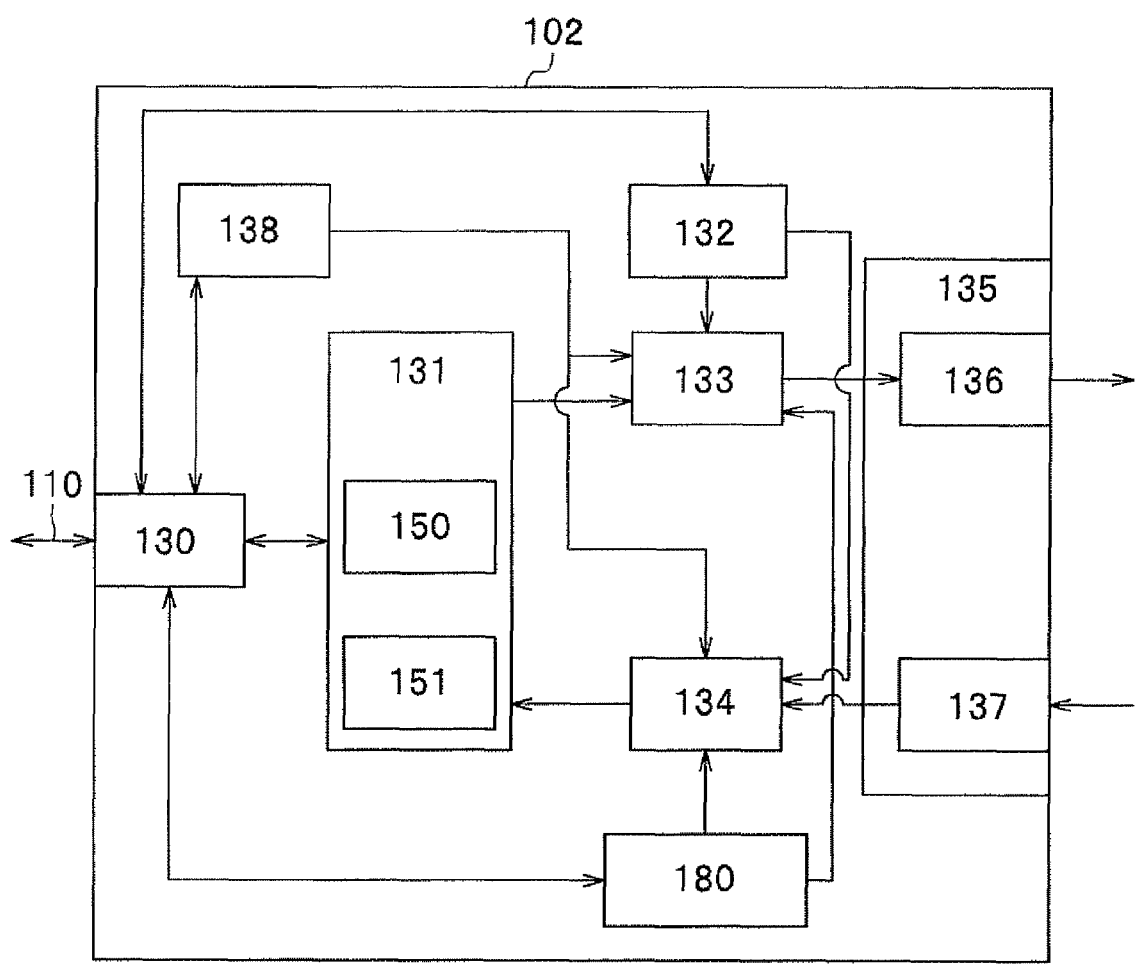
FIG. 13 is a configuration diagram illustrating communication LSI according to a second embodiment of the present invention.

FIG. 13 is a configuration diagram illustrating the communication LSI 102 according to the second embodiment. An address correction value management unit 180 is added to FIG. 13, as compared to FIG. 2. The address correction value management unit 180 manages an association between an address which the data storage unit 131 makes available on the bus 110 and an address in a logical address space, as address association information 190 shown in FIG. 14A. In other words, in the configuration of the second embodiment, because the address correction value management unit 180 is added to that of the first embodiment, a logical address space of a network of EtherCAT (registered trademark) can be utilized and a network structure can be flexibly built.

FIG. 14A is a diagram illustrating the address association information 190 managed by the address correction value management unit 180. The address association information 190 includes one or more records each including an address 191, a bus address 192, a logical address 193, and a size 194, which are associated with one another.

The address 191 is an address in the data storage unit 131.

The bus address 192 is a bus address of the address 191 associated therewith in the address association information 190.

The logical address 193 is an address in a logical address space associated therewith in the address association information 190.

The size 194 is a size of the address association information 190 associated therewith.

For example, in the address association information 190 of FIG. 14A, addresses 0xef000000 to 0xef00FFFF on the bus 110 are associated with EtherCAT (registered trademark)-specified logical address spaces of 0x10000 to 0x1FFFF, which are further associated with addresses 0x0 to 0xFFFF in the data storage unit 131.

FIG. 14B is a diagram illustrating an example of a packet generation information 201. The packet generation information 201 includes a logical address 202, an input/output direction 203, and a size 204.

The logical address 202 is a logical address targeted by a packet generated from the packet generation information 201.

The input/output direction 203 indicates whether the generated packet is for read, for write, or for read/write. Herein, in this embodiment, an EtherCAT (registered trademark) command to a logical address is to be generated, and thus, the input/output direction 203 uniquely determines a command to a logical address (LRD, LWR, and LRW).

The size 204 shows a size of a data area of the generated packet.

Figure 15:
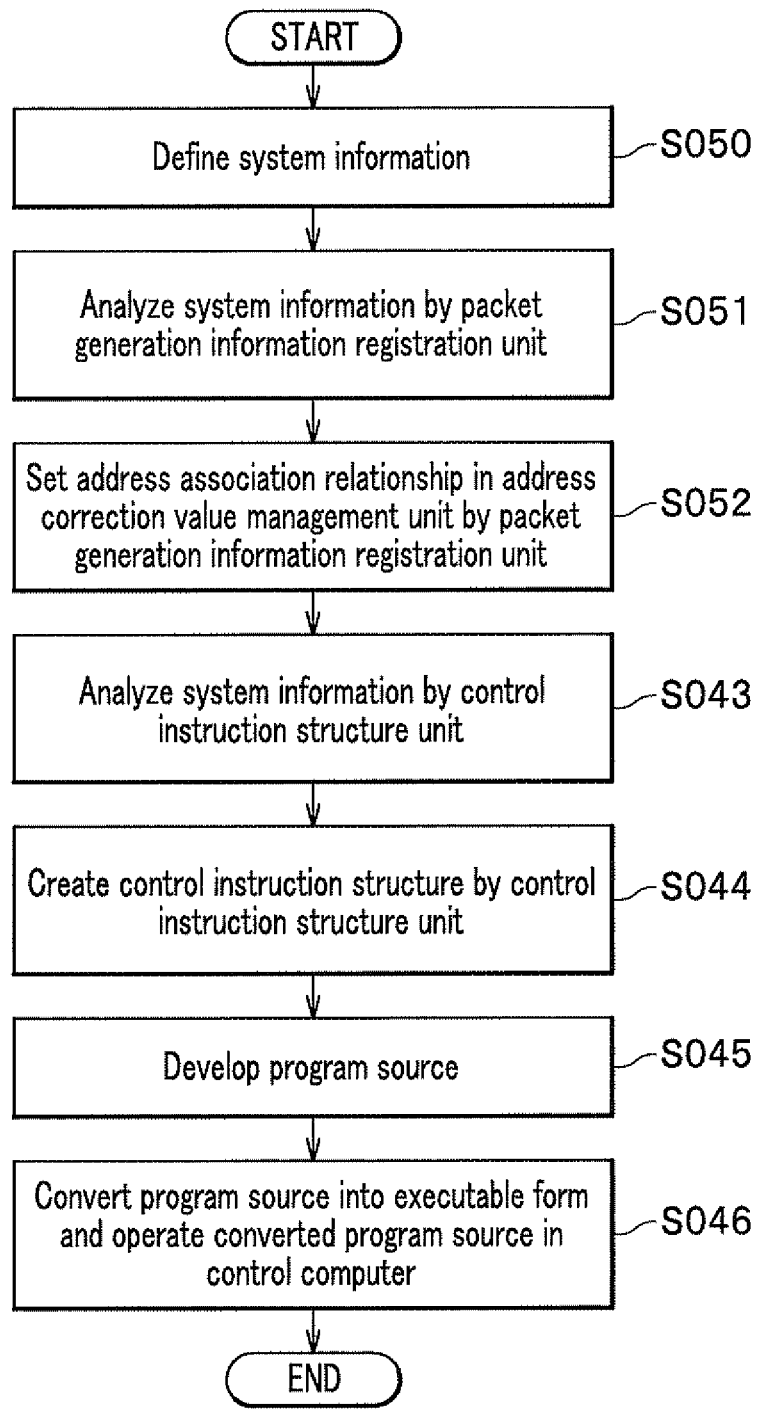
FIG. 15 is a flowchart illustrating steps of developing an application executed by a development computer according to the second embodiment.

FIG. 15 illustrates steps of developing the application 168 which is executed by the development computer 169. Description is made especially focusing on differences from FIG. 12.

Steps S050 to S052 of FIG. 15 correspond to the steps S040 to S042 of FIG. 12.

In S050, the system information 170 received by the development computer 169 is constituted only by a command to a logical address (LRD, LWR, and LRWcommand).

S051 is similar to S041 and is different therefrom only in contents of the system information 170 received in S050.

In S052, the packet generation information registration unit 161 allocates a data structure to the data storage unit 131 and writes an address obtained from a result of the allocation, as the address association information 190 and the packet generation information 201 via the address correction value management unit 180.

Figure 16:
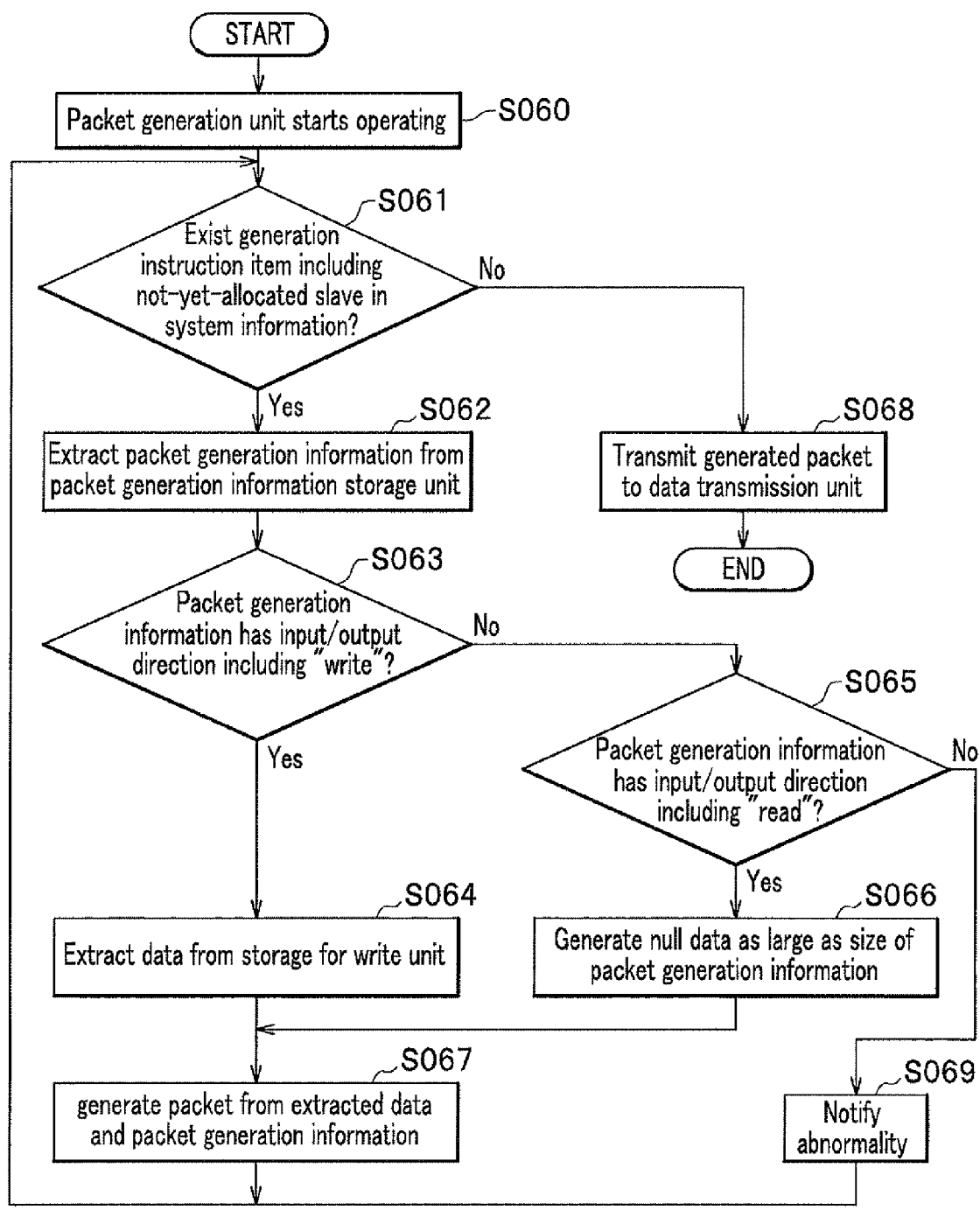
FIG. 16 is a flowchart illustrating a processing performed when a packet generation unit transmits a packet according to the first and second embodiments.

FIG. 16 is a flowchart illustrating a processing performed when the packet generation unit 133 transmits a packet according to the first and second embodiments.

In S060, the packet generation unit 133 starts operating. Note that the operation management unit 138 controls a timing of starting S060. For example, the timing may be when the application 168 running on the CPU 101 makes an instruction to the operation management unit 138 via the bus connection unit 130, or when the operation management unit 138 makes the packet generation unit 133 start operating at a preset interval.

In S061, it is determined whether or not there is a not-yet-processed record of the packet generation information 141 is in the packet generation information storage unit 132. If Yes in S061, the processing advances to S062. If No in S061, the processing advances to S068.

In S062, one not-yet-processed record of the packet generation information 141 is extracted from the packet generation information storage unit 132.

In S063, it is determined whether or not the record of the packet generation information 141 has the input/output direction 146 including "write". If Yes in S063, the processing advances to S064. If No in S063, the processing advances to S065.

In S064, a data as large as the size 147 shown in the packet generation information 141 is extracted from the address 143 shown in the packet generation information 141, in the storage for write unit 150 of the data storage unit 131.

Note that, in S064 of the second embodiment, an address of the data extracted from the storage for write unit 150 is determined by the logical address 202 and the address association information 190. That is, a record including the logical address 202 is searched from the address association information 190. The address 191 of the searched record of the address association information 190 is an address of the data extracted from the storage for write unit 150.

In S065, it is determined whether or not the record of the packet generation information 141 has the input/output direction 146 including "read". If Yes in S065, the processing advances to S066. If No in S065, the processing advances to S069. Note that, if the input/output direction 146 includes both read and write, there is no need to perform S065 after S064, because necessary data is generated from the storage for write unit 150.

In S066, a null data as large as the size 147 shown in the packet generation information is generated.

In S067, a packet (a telegram. 215 of FIG. 17) is generated from the data extracted in S064 or the data generated in S066, based on the packet generation information 141.

Note that, in the telegram 215, header information (a telegram header 216 of FIG. 17) or the like which is not dependent on each packet is extracted from the operation management unit 138.

In S068, there exists no not-yet-processed record of the packet generation information 141 (if No in S061), one or more packets generated in S067 (the telegram 215 of FIG. 17) are collected into a unitary packet (the Ethernet frame 210 of FIG. 17) and the unitary packet is transmitted to the data transmission unit 136. Note that the Ethernet header 211 and the FCS 213 in the Ethernet frame 210 of FIG. 17 may be added at the data transmission unit 136.

In S069, if there is a record of the packet generation information 141 which has the input/output direction 146 not including "read", the record is abnormal, which is notified accordingly. For example, the packet generation unit 133 notifies the operation management unit 138 of the abnormality, and the notification is made to be obtainable from an application running on the CPU 101. Alternatively, the operation management unit 138 performs an interrupt for notifying the CPU 101 of the abnormality.

Figure 17:
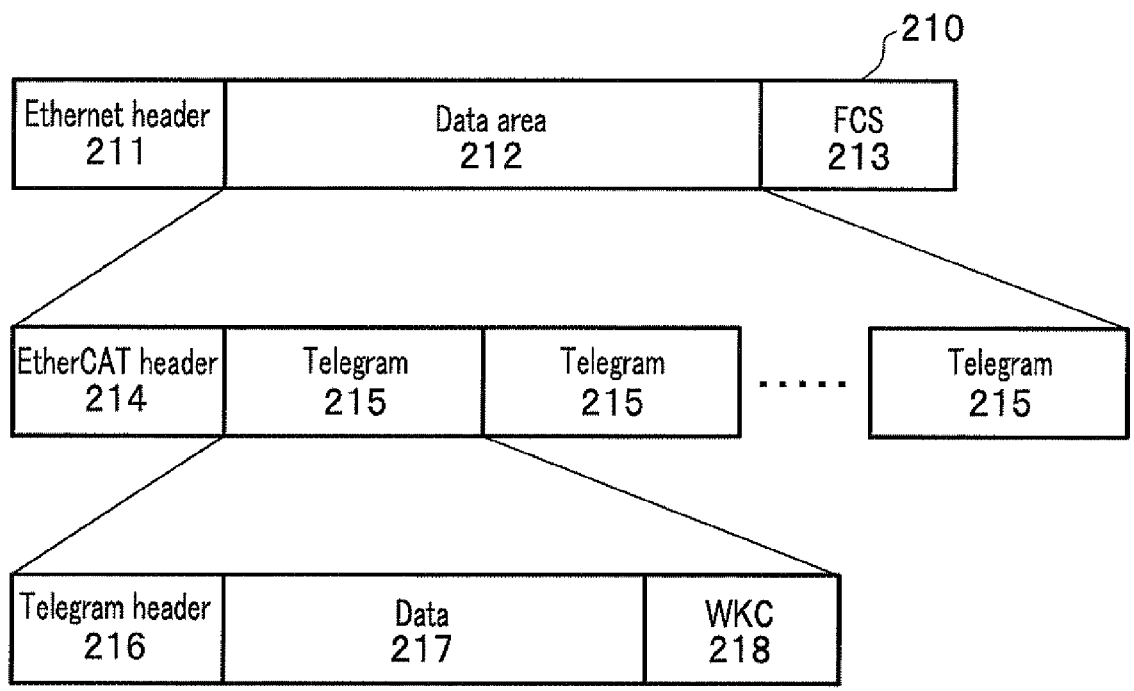
FIG. 17 is a structure illustrating an Ethernet (registered trademark) frame which is an EtherCAT frame created in the processing of FIG. 16, according to the first and second embodiments.

FIG. 17 illustrates a structure of the Ethernet frame 210 which is an EtherCAT (registered trademark) frame created in the processing of FIG. 16. Each Ethernet frame 210 includes one Ethernet header 211, one data area 212, and one FCS (Frame Check Sequence) 213. A type field of the Ethernet header 211 in the EtherCAT (registered trademark) is 0x88A4. The FCS 213 is used for testing whether or not a data in the data area 212 is correct (for example, whether or not the data is damaged due to a communication error or the like). A processing of creating the Ethernet frame 210 corresponds to S068 of FIG. 16.

Each data area 212 includes one EtherCAT header 214 and one or more telegrams 215.

Each telegram 215 includes one telegram header 216, one telegram data 217, and one working counter (WKC) 218. One telegram data 217 stores therein a data which is read or write in one or more slaves. That is, one Ethernet frame 210 includes a data which is read and write in a plurality of slaves. The working counter 218 is a field in which, each time a telegram is subjected an appropriate processing in an appropriate slave, a prescribed number of times is counted up by the slave. A processing of creating the telegram 215 corresponds to S067 of FIG. 16.

In FIG. 16, the packet generation unit 133 operates with the packet generation information 141 which is fixed. However, the packet generation information 141 may be dynamically changed according to an application running on the CPU 101. Or, a record of the packet generation information 141 to be subjected to the processing may be selected from among a plurality of records of the packet generation information 141. In the latter case, each record of the packet generation information 141 includes an additional item indicating whether the record is available or not.

The packet generation unit 133 may advance the processing to S068, for example, in the following cases, even if there is still a record of the packet generation information 141 which has not yet been subjected to the processing in S061 of FIG. 16:

if a total amount of a size of the telegram data 217 generated in S067 is more than a maximum length of the Ethernet frame 210; and if, when the packet generation unit 133 operates at a prescribed interval, a size of the not-yet-processed record is more than a packet size which can be processed within the interval.

Further, the above-described states may be notified using methods similar to those described in S069.

Figure 18:
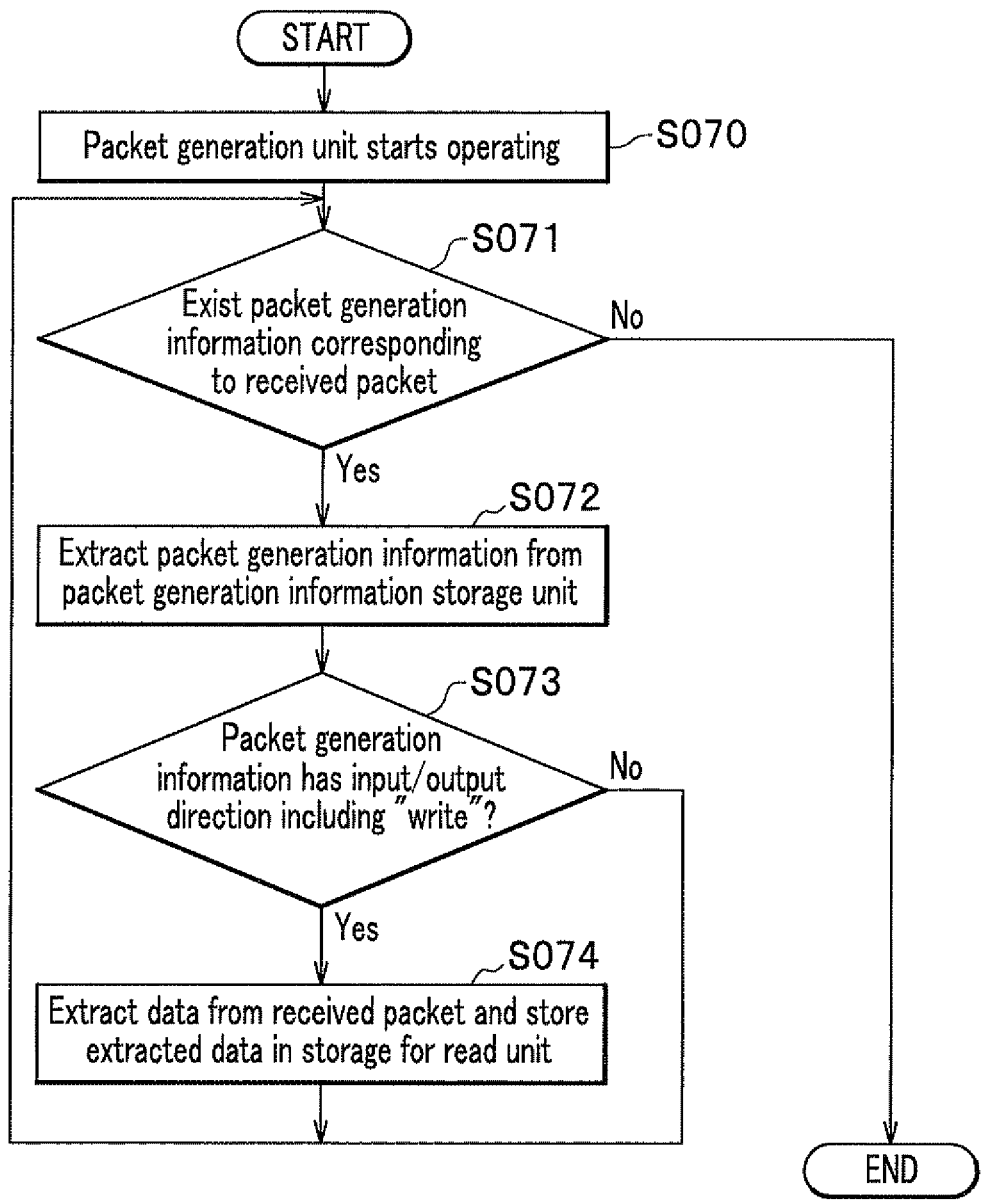
FIG. 18 is a flowchart illustrating a processing performed when a packet filter unit receives a packet according to the first and second embodiments.

FIG. 18 is a flowchart illustrating a processing performed when the packet filter unit 134 receives a packet, according to the first and second embodiments.

In S070, the packet filter unit 134 starts operating. Note that, S070 is started at a timing when the data reception unit 137 receives a packet and transmits the packet to the packet filter unit 134. The data reception unit 137 extracts one or more telegrams 215 from one Ethernet frame 210 and transmits the extracted telegrams 215 to the packet filter unit 134 one by one.

In S071, it is determined whether or not there is a record of the packet generation information 141 corresponding to the received packet (the telegram 215), in the packet generation information storage unit 132. If Yes in S071, the processing advances to S072. If No in S071, the processing terminates the processing of FIG. 18.

In S072, the record of the packet generation information 141 corresponding to the packet received from the packet generation information storage unit 132 is extracted.

In S073, it is determined whether or not the extracted record of the packet generation information 141 has the input/output direction 146 of write. If Yes in S073, the processing advances to S074. If No in S073, the processing returns to S071.

In S074, a necessary data is extracted from the received packet and is stored in the storage for read unit 151. A data area thereof starts at the address 143 and is as large as the size 147 shown in the record of the packet generation information 141 extracted in S072.

Note that in S074 of the second embodiment, an address at the starting point of a data area in a storage unit is determined using the logical address 202 and the address association information 190. That is, the logical address 193 of the address association information 190 is searched to detect whether or not any logical address 193 includes the logical address 202. The address 191 of the address association information 190 is an address of a data to be stored in the storage for read unit 151.

According to the first and second embodiments of the present invention described above, an information processing apparatus having improved development efficiency and communication performance can be provided.

With respect to the improved development efficiency, a developer can develop the program source 162 so as to develop the application 168, making use of the control instruction structure 163 and the API 167. This makes it possible for the developer to efficiently develop the application without much need of going into details of a network protocol or taking an address location of each control instruction into account.

With respect to the improved communication performance, the communication LSI 102 and the application 168 running on the CPU 101 can be executed in parallel. Further, a control instruction can be transmitted to the communication LSI 102 by an API such as a mmap function, instead of using a protocol stack, thus allowing a communication processing time in software to be reduced.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

The invention claimed is:

1. A control network system in which a master apparatus that generates a control packet is connected to a slave device that is controlled according to the control packet,
   wherein the master apparatus comprises a computing unit, a transmission-target packet generation information registration unit, a packet generation unit, a communication unit, and a storage section, and a packet generation information selection section,
   wherein the computing unit: operates the packet generation information registration unit; computes a control instruction; and notifies the packet generation information registration unit of the computed control instruction,
   wherein the packet generation information registration unit: allocates, for each control command to the slave device, a data area to the storage section which stores and holds therein a data handled by the control command; associates an allocated address, the control command to the slave device, an input/output direction of the data, a size of the data, and a protocol address for data access in a storage area in the slave device, with one another as associated data; registers the associated data in the storage section as packet generation information; and updates the packet generation information registered in the storage section using the control instruction notified by the computing unit,
   wherein the transmission-target packet generation information selection section is configured to determine whether or not to use the packet generation information registered in the storage section for generating a telegram based on at least information constituting the packet generation information,
   wherein to generate the control packet, the packet generation unit: references the packet generation information for each control command selected by the transmission-target packet generation information selection section, at a prescribed timing, to thereby generate telegrams; and combines the generated telegrams, to thereby generate the control packet constituted by the telegrams, and
   wherein the communication unit transmits the generated control packet to the slave device.

2. The control network system according to claim 1,
   wherein the master apparatus further comprises a packet filter unit, and
   wherein the packet filter unit: selects a control command for reading a data from the slave device to the master apparatus, from among a control command included in the control packet received via the communication unit; references the packet generation information for each of the selected control command; and writes a data read from the control packet, to an address in the storage section corresponding to the each control command.

3. The control network system according to claim 2,
   wherein, in the control network system, one or more master apparatuses and a plurality of slave devices are connected via a ring network, and
   wherein, if the control packet which includes respective control commands to the plurality of the slave devices is transmitted from the master apparatus, the control packet is sequentially transferred to the slave devices via the ring network and is returned to the master apparatus from which the control packet has been transmitted.

4. The control network system according to claim 3,
   wherein the master apparatus further comprises an address correction value management unit,
   wherein the address correction value management unit associates a logical address in a logical address space which is shared by respective units in the control network system, with an address in the storage section of the master apparatus, and stores the logical address in the storage section, and
   wherein the packet generation unit acquires an address in the storage section in which a data for write is stored for each of the selected control command, from among information on the association with the logical address stored by the address correction value management unit.

5. The control network system according to claim 4,
   wherein the master apparatus makes a control instruction structure available to an application running on the master apparatus, the control instruction structure being a data structure for making an access from the application to the data area in the storage section allocated by the packet generation information registration unit,
   wherein the master apparatus makes a basic software operate, the basic software associating a data area of a variable materialized in the application with a data area in a computer resource,
   wherein the control instruction structure is a variable which indicates data contents handled by the control command of the packet generation information, for each of the control command, and
   wherein the master apparatus associates the variable with a data area in the storage section corresponding to the control command of the variable using the basic software which operates in the master apparatus and has functionality of association.

6. The control network system according to claim 5,
   wherein the control instruction structure is configured as at least one of a data structure of a structure of a programming language, a data structure of a union of a programming language, and a data structure of an object of an object oriented language.

7. A master apparatus that generates a control packet and is used in a control network system in which the master apparatus is connected to a slave device that is controlled according to the control packet, wherein the master apparatus comprises:
a computing unit, a transmission-target packet generation information registration unit,
a packet generation unit;
a communication unit; a storage section, and
a packet generation information selection section,
wherein the computing unit: operates the packet generation information registration unit; computes a control instruction; and notifies the packet generation information registration unit of the computed control instruction,
wherein the packet generation information registration unit: allocates, for each control command to the slave device, a data area to the storage section which stores and holds a data handled by the control command; associates an allocated address, the control command to the slave device, an input/output direction of the data, a size of the data, and a protocol address for data access in a storage area in the slave device, with one another as associated data; registers the associated data in the storage section as packet generation information, and updates the packet generation information registered in the storage section using the control instruction notified by the computing unit,
wherein the transmission-target packet generation information selection section is configured to determine whether or not to use the packet generation information registered in the storage section for generating a telegram based on at least information constituting the packet generation information,
wherein to generate the control packet, the packet generation unit: references the packet generation information for each control command selected by the transmission-target packet generation information selection section, at a prescribed timing, to thereby generate telegrams; and combines the generated telegrams, to thereby generate the control packet constituted by the telegrams, and
wherein the communication unit transmits the generated control packet to the slave device.

8. A control data processing method using a control network system which connects a master apparatus that generates a control packet, to a slave device that is controlled according to the control packet,
a computing unit, a transmission-target packet generation information registration unit, a packet generation unit, a communication unit, and a storage section, and a packet generation information selection section,
wherein the computing unit: operates the packet generation information registration unit; computes a control instruction; and notifies the packet generation information registration unit of the computed control instruction,
wherein the packet generation information registration unit: allocates, for each control command to the slave device, a data area to the storage section which stores and holds a data handled by the control command; associates an allocated address, the control command to the slave device, an input/output direction of the data, a size of the data, and a protocol address for data access in a storage area in the slave device, with one another as associated data; registers the associated data in the storage section as packet generation information; and updates the packet generation information registered in the storage section using the control instruction notified by the computing unit,
wherein the transmission-target packet generation information selection section is configured to determine whether or not to use the packet generation information registered in the storage section for generating a telegram based on at least information constituting the packet generation information,
wherein to generate the control packet, the packet generation unit: references the packet generation information for control command selected by the transmission-target packet generation information selection section, at a prescribed timing, to thereby generate telegrams; and combines the generated telegrams, to thereby generate the control packet constituted by the telegrams, and
wherein the communication unit transmits the generated control packet to the slave device.

9. A non-transitory, computer readable medium embodying a control data processing program which makes the master apparatus which is a computer, execute the control data processing method according to claim 8.

10. The control network system according to claim 1,
wherein, to the packet generation information is added an attribute which indicates whether generation of the packet generation information itself is enabled or disabled, and
wherein, if the attribute indicates that generation of the packet generation information is enabled, the transmission-target packet generation information selection section selects the packet generation information.

11. The control network system according to claim 1,
wherein, if a total amount of a data size of the selected packet generation information is larger than a prescribed threshold, the transmission-target packet generation information selection section does not select the packet generation information other than the selected packet generation information.

12. The control network system according to claim 11,
wherein the prescribed threshold is a maximum packet size of the control network system.

13. The control network system according to claim 11,
wherein the prescribed threshold is a packet size which can be processed within a prescribed interval.

* * * * *